(12) United States Patent
Kawasaki et al.

(10) Patent No.: US 6,519,650 B1
(45) Date of Patent: Feb. 11, 2003

(54) SYSTEM AND METHOD FOR CONTROLLING DATA TRANSFER BETWEEN PORTABLE MEDIAS AND A PROCESSOR TO MINIMIZE COMMUNICATION HARDWARE REQUIREMENTS

(75) Inventors: Yusuke Kawasaki, Kawasaki (JP); Shigeru Hashimoto, Kawasaki (JP); Koken Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/376,467

(22) Filed: Aug. 18, 1999

(30) Foreign Application Priority Data

Oct. 22, 1998 (JP) .......................................... 10-301500

(51) Int. Cl.[7] .......................................... G06F 15/173
(52) U.S. Cl. ........................ 709/244; 709/200; 709/202; 709/204; 709/227; 709/231; 709/237; 710/1; 710/5; 710/36
(58) Field of Search ............................... 709/200–204, 709/213–215, 227–228, 230–231, 236–238, 242–244; 710/1–2, 5, 22, 36–37; 705/21, 73–76, 79; 235/375, 380

(56) References Cited

U.S. PATENT DOCUMENTS

| | | | | |
|---|---|---|---|---|
| 5,600,793 A | * | 2/1997 | Nord ........................... | 709/237 |
| 5,615,388 A | * | 3/1997 | Yoshimatsu et al. ........... | 710/1 |
| 5,878,271 A | * | 3/1999 | Crump et al. .................. | 710/1 |
| 6,009,247 A | * | 12/1999 | Canora et al. ............... | 709/227 |
| 6,058,427 A | * | 5/2000 | Viswanath et al. ......... | 709/231 |
| 6,081,828 A | * | 6/2000 | Yonemochi et al. ........ | 709/200 |
| 6,098,055 A | * | 8/2000 | Watanabe ..................... | 705/73 |
| 6,256,781 B1 | * | 7/2001 | Okajima ....................... | 710/62 |

FOREIGN PATENT DOCUMENTS

| | | |
|---|---|---|
| EP | 0 831 413 A2 | 3/1998 |
| EP | 0 881 590 A1 | 12/1998 |
| WO | WO 98/27767 | 6/1998 |

* cited by examiner

Primary Examiner—Bharat Barot
(74) Attorney, Agent, or Firm—Armstrong, Westerman & Hattori, LLP

(57) ABSTRACT

The present invention relates to a method and system capable of gaining access (data transfer) to portable type mediums whose number is larger than the number of ports on a processing unit side. Thus, in this invention, by using a demultiplexer, to one or more portable type medium ports provided in a processing unit there are connected a plurality of portable type mediums whose number is larger than the number of the ports. The demultiplexer selectively switches the ports and, of the plurality of portable type mediums, the mediums to be accessed by the processing unit for establishing the connections therebetween. This invention is applicable to data transfer between a plurality of portable type mediums such as IC cards capable of storing digital money and a processing unit having an ability to gain access to these portable type mediums.

15 Claims, 24 Drawing Sheets

```
#90   ROOT                         550
#01   IFD=#90  PORT=#1
#02   IFD=#01  PORT=#1
#03   IFD=#01  PORT=#2
#04   IFD=#02  PORT=#1
#05   IFD=#02  PORT=#2
```

```
[DEVICE DEFINITION]                550
#01   IFD=#01
#02   IFD=#02         ICCRW01
#03   IFD=#02         ICCRW02
#20   IFD=#01         LCD
#21   IFD=#01         KEY
```

FIG. 18

| Bit No. | NAME | UNIT NAME | VALUE OF Bit | |
|---|---|---|---|---|
| | | | 0 | 1 |
| 15 | UPSYS | UPPER UNIT | CONNECTION | NON-CONNECTION |
| 14 | LWSYS | LOWER UNIT | CONNECTION | NON-CONNECTION |
| 13 | EXROM | EXTERIOR TYPE ROM | CONNECTION | NON-CONNECTION |
| 12 | EXFLSH | EXTERIOR TYPE FLASH | CONNECTION | NON-CONNECTION |
| 11 | EXRAM | EXTERIOR RAM | CONNECTION | NON-CONNECTION |
| 10 | KB | KEYBOARD | CONNECTION | NON-CONNECTION |
| 9 | GB | GREEN BUTTON | CONNECTION | NON-CONNECTION |
| 8 | BZ | BUZZER | CONNECTION | NON-CONNECTION |
| 7 | MS | MS READER | CONNECTION | NON-CONNECTION |
| 6 | CNVY | CONVEYER | CONNECTION | NON-CONNECTION |
| 5 | DEMPX | CARD SWITCH | CONNECTION | NON-CONNECTION |
| 4 | ICCNO2 | NUMBER OF IC CARD TO BE CONNECTED | SEE FIG. 19 | |
| 3 | ICCNO1 | | | |
| 2 | ICCNO0 | | | |
| 1 | EXBUS | EXTENDED BUS | CONNECTION | NON-CONNECTION |
| 0 | EXIO | EXTENDED I/O | CONNECTION | NON-CONNECTION |

FIG. 19

| DEMPX | ICCNO2 | ICCNO1 | ICCNO0 | NUMBER OF IC CARD TO BE CONNECTED |
|---|---|---|---|---|
| X | 0 | 0 | 0 | 0 |
| X | 0 | 0 | 1 | 1 |
| X | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |

FIG. 24

| Bit No. | 7 | 6 | 5 | 4 | 3 | 2 | 1 | 0 | INITIAL VALUE |
|---|---|---|---|---|---|---|---|---|---|
| NAME | – | – | – | CDSEL4 | CDSEL3 | CDSEL2 | CDSEL1 | CDSEL0 | |
| CDSEL 002080 | | | | | | | | | 0bxxx00000 |
| READ/WRITE | – | – | – | R/W | R/W | R/W | R/W | R/W | |

FIG. 25

| CDSEL4 | CDSEL3 | CDSEL2 | CDSEL1 | CDSEL0 | PORT A | PORT B |
|---|---|---|---|---|---|---|
| 0 | 0 | 0 | 0 | 0 | DEMULTIPLEXER RESET | |
| 0 | 0 | 0 | 0 | 1 | CARD 0 SELECTION | CARD 1 SELECTION |
| 0 | 0 | 0 | 1 | 0 | CARD 0 SELECTION | CARD 2 SELECTION |
| 0 | 0 | 0 | 1 | 1 | CARD 0 SELECTION | CARD 3 SELECTION |
| 0 | 0 | 1 | 0 | 0 | CARD 0 SELECTION | CARD 4 SELECTION |
| 0 | 0 | 1 | 0 | 1 | CARD 0 SELECTION | CARD 5 SELECTION |
| 0 | 0 | 1 | 1 | 0 | CARD 1 SELECTION | CARD 0 SELECTION |
| 0 | 0 | 1 | 1 | 1 | CARD 1 SELECTION | CARD 2 SELECTION |
| 0 | 1 | 0 | 0 | 0 | CARD 1 SELECTION | CARD 3 SELECTION |
| 0 | 1 | 0 | 0 | 1 | CARD 1 SELECTION | CARD 4 SELECTION |
| 0 | 1 | 0 | 1 | 0 | CARD 1 SELECTION | CARD 5 SELECTION |
| 0 | 1 | 0 | 1 | 1 | CARD 2 SELECTION | CARD 0 SELECTION |
| 0 | 1 | 1 | 0 | 0 | CARD 2 SELECTION | CARD 1 SELECTION |
| 0 | 1 | 1 | 0 | 1 | CARD 2 SELECTION | CARD 3 SELECTION |
| 0 | 1 | 1 | 1 | 0 | CARD 2 SELECTION | CARD 4 SELECTION |
| 0 | 1 | 1 | 1 | 1 | CARD 2 SELECTION | CARD 5 SELECTION |
| 1 | 0 | 0 | 0 | 0 | CARD 3 SELECTION | CARD 0 SELECTION |
| 1 | 0 | 0 | 0 | 1 | CARD 3 SELECTION | CARD 1 SELECTION |
| 1 | 0 | 0 | 1 | 0 | CARD 3 SELECTION | CARD 2 SELECTION |
| 1 | 0 | 0 | 1 | 1 | CARD 3 SELECTION | CARD 4 SELECTION |
| 1 | 0 | 1 | 0 | 0 | CARD 3 SELECTION | CARD 5 SELECTION |
| 1 | 0 | 1 | 0 | 1 | CARD 4 SELECTION | CARD 0 SELECTION |
| 1 | 0 | 1 | 1 | 0 | CARD 4 SELECTION | CARD 1 SELECTION |
| 1 | 0 | 1 | 1 | 1 | CARD 4 SELECTION | CARD 2 SELECTION |
| 1 | 1 | 0 | 0 | 0 | CARD 4 SELECTION | CARD 3 SELECTION |
| 1 | 1 | 0 | 0 | 1 | CARD 4 SELECTION | CARD 5 SELECTION |
| 1 | 1 | 0 | 1 | 0 | CARD 5 SELECTION | CARD 0 SELECTION |
| 1 | 1 | 0 | 1 | 1 | CARD 5 SELECTION | CARD 1 SELECTION |
| 1 | 1 | 1 | 0 | 0 | CARD 5 SELECTION | CARD 2 SELECTION |
| 1 | 1 | 1 | 0 | 1 | CARD 5 SELECTION | CARD 3 SELECTION |
| 1 | 1 | 1 | 1 | 0 | CARD 5 SELECTION | CARD 4 SELECTION |
| 1 | 1 | 1 | 1 | 1 | LATCH ALL OUTPUTS | |

SYSTEM AND METHOD FOR CONTROLLING DATA TRANSFER BETWEEN PORTABLE MEDIAS AND A PROCESSOR TO MINIMIZE COMMUNICATION HARDWARE REQUIREMENTS

BACKGROUND OF THE INVENTION

1) Field of the Invention

The present invention relates to a method and system for controlling data transfer between, for example, a plurality of portable type mediums such as IC (Integrated Circuit) cards capable of storing digital money and a processing unit capable of gaining access to these portable type mediums.

2) Description of the Related Art

In the recent years, a variety of transaction apparatus capable of handling digital money (electronic money, E-money) and credit transactions have been developed, such as ATMs (Automatic Teller Machines), ECRs (Electric Cash Registers), digital money load terminals, electronic purses, and POS terminals/hand-held POS terminals (handy POSs)/POS servers constituting POS (Point Of Sales) systems.

The above-mentioned various transaction apparatus (processing units) gain access to IC cards (portable type mediums) storing digital money for accomplishing transaction based upon digital money, and usually accept mounting of a plurality of IC cards for access thereto. Conventionally, such transaction apparatus are equipped with IC card control circuits (card ports) whose number is identical to the number of IC cards to be mounted.

For instance, FIG. 28 shows the essence of a general transaction apparatus (processing unit) 300 in which four IC cards (portable type mediums) 320 to 323 are mountable. As shown in FIG. 28, the transaction apparatus 300 has four IC card control circuits 310 to 313 corresponding to the four IC cards 320 to 323.

These IC card control circuits 310 to 313 include card ports CP0 to CP3 to be connected to the IC cards 320 to 323, respectively, and control the IC cards 320 to 323 while conducting power supply/clock supply through the card ports CP0 to CP3 to the IC cards 320 to 323, thereby gaining direct access to these IC cards 320 to 323.

The connections between the IC card control circuits 310 to 313 and the IC cards 320 to 323 are made through data lines (Data), C4 signal lines (C4), C8 signal lines (C8), reset signal lines (Reset), power supply lines (Power Supply), clock supply lines (CLK Supply) and IC card mounting notice lines.

Although the IC card mounting notice lines are not shown in FIG. 28, the IC card mounting notice lines are 1-bit signal lines for informing each of the IC card control circuits 310 to 313 of whether each of the IC cards 320 to 323 is coupled with each of the card ports CP0 to CP3. Each of the IC card control circuits 310 to 313, which has received a notice on the mounting of each of the IC cards 320 to 323 through each of the IC card mounting notice lines, starts the power supply/clock supply to each of the IC cards 320 to 323.

In addition, the power supply lines (Power Supply) and the clock supply lines (CLK Supply) always supply power and a clock signal to the IC cards 320 to 323 connected thereto. On the other hand, in the case of the data lines (Data), the C4 signal lines (C4), the C8 signal lines (C8) and the reset signal lines (Reset), the lines connected to the IC cards 320 to 323 to which the IC card control circuits 310 to 313 have access are made to be placed into activation.

In the case of the example of FIG. 28, in a state where the four IC cards 320 to 323 are connected to the transaction apparatus 300, the two IC card control circuits 310 and 312 operate simultaneously in response to instructions from a CPU (not shown) in the transaction apparatus 300 so that the IC card control circuit 310 gains access to the IC card 320 while the IC card control circuit 312 makes access to the IC card 322. Upon receipt of commands from the IC card control circuits 310, 312, the IC cards 320, 322 return responses to these commands to the IC card control circuits 310, 312, respectively.

By simultaneously making access to the two IC cards 320, 322 in this way, the transaction apparatus 300 can conduct transaction processing, such as transfer of digital money between the two IC cards 320, 322, as indicated by arrows A1, A2 in FIG. 28.

Since the above-described conventional technique needs the installation of card ports (IC card control circuits), whose number is identical to the number of a plurality of IC cards, for controlling the plurality of IC cards, if a need exists for increasing the number of IC cards to be controlled by the transaction apparatus, then this results in an increase in the number of card ports to be provided in the transaction apparatus.

As mentioned above, there is a need to place at least 7 lines including the data line, the C4 signal line, the C8 signal line, the reset signal line, the clock supply line, the power supply line and the IC card mounting notice line in connection with one card port. Thus, for example, in the case of dealing with six IC cards with one processing unit, that processing unit requires not only 6 IC card control circuits but also at least 42 (=6*7) lines, leading to an increase in the manufacturing cost of the processing unit (transaction apparatus). Particularly, if the processing unit (transaction apparatus) is formed into an integrated circuit, the aforesaid large numbers of lines and IC card control circuits are required to be integrated at high density, which contributes to a rise of its manufacturing cost and an increase in its circuit scale.

Meanwhile, in most cases, the processing unit actually handling digital money gains access to only one IC card or makes access to two IC cards as shown in FIG. 28, but seldom needed to concurrently make access to three or more IC cards. For this reason, in the case that six card ports are provided to cover six IC cards, of these card ports, four or more card ports frequently run to waste.

SUMMARY OF THE INVENTION

The present invention has been developed in consideration of this situation, and it is therefore an object of this invention to provide a data transfer control method and a data transfer control system which are capable of providing access (data transfer) to portable type mediums whose number is larger than the number of card ports on the processing unit side.

For this purpose, in accordance with this invention, there is provided a data transfer control method of controlling data transfer between a plurality of portable type mediums and a processing unit having an ability to gain access to the plurality of portable type mediums, wherein the processing unit is equipped with one or more ports for the plurality of portable type mediums, and the portable type mediums, whose number is larger than the number of the ports, are connected through a demultiplexer to the ports so that the demultiplexer selectively switches the ports and the portable type mediums to be accessed by the processing unit to establish connection between the portable type mediums and the ports.

Furthermore, in accordance with this invention, there is provided a data transfer control system, interposed between a plurality of portable type mediums and a processing unit capable of gaining access to the plurality of portable type mediums, for controlling data transfer between the plurality of portable type mediums and the processing unit, and comprising a demultiplexer capable of making connection between one or more ports for the portable type mediums in the processing unit and the plurality of portable type mediums whose number is larger than the number of the ports, with the demultiplexer selectively switching the ports and the portable type mediums of the plurality of portable type mediums to be accessed by the processing unit to establish connection between the ports and the portable type mediums.

With the data transfer control method and the data transfer control system, since the switching of the connection states between the ports and the portable type mediums by the demultiplexer allows the processing unit access to the portable type mediums whose number is larger than the number of the ports on the processing unit side, in the case of increasing the number of portable type mediums to be controlled by the processing unit, there is no need to increase the numbers of ports and the number of portable medium control circuits on the processing unit side.

Accordingly, it is possible to increase the number of portable type mediums to be controlled without raising the processing unit manufacturing cost. Particularly, in the case that the processing unit is constructed as an integrated circuit, even if the number of portable type mediums to be controlled increases, it is possible to eliminate the need to integrate a large number of lines and portable type medium control circuits at high density, which contributes considerably to the reduction of manufacturing cost and circuit scale.

BRIEF DESCRIPTION OF THE DRAWINGS

FIG. 18 is an illustration useful for explaining the meaning of each of bits of the configuration information register in the protocol controller according to this embodiment;

FIG. 19 is an illustration useful for explaining the meaning of each of bits of the configuration information register in the protocol controller according to this embodiment;

FIG. 24 is an illustration of a configuration of an IC card port allocation register (CDSEL) to be employed at the output of a select signal to the demultiplexer in the protocol controller according to this embodiment;

FIG. 25 is an illustration for explaining the meaning of each of bits of the IC card port allocation register in the protocol controller according to this embodiment;

DESCRIPTION OF THE PREFERRED EMBODIMENTS

[0] Description of Aspect of the Invention

Figure 1:
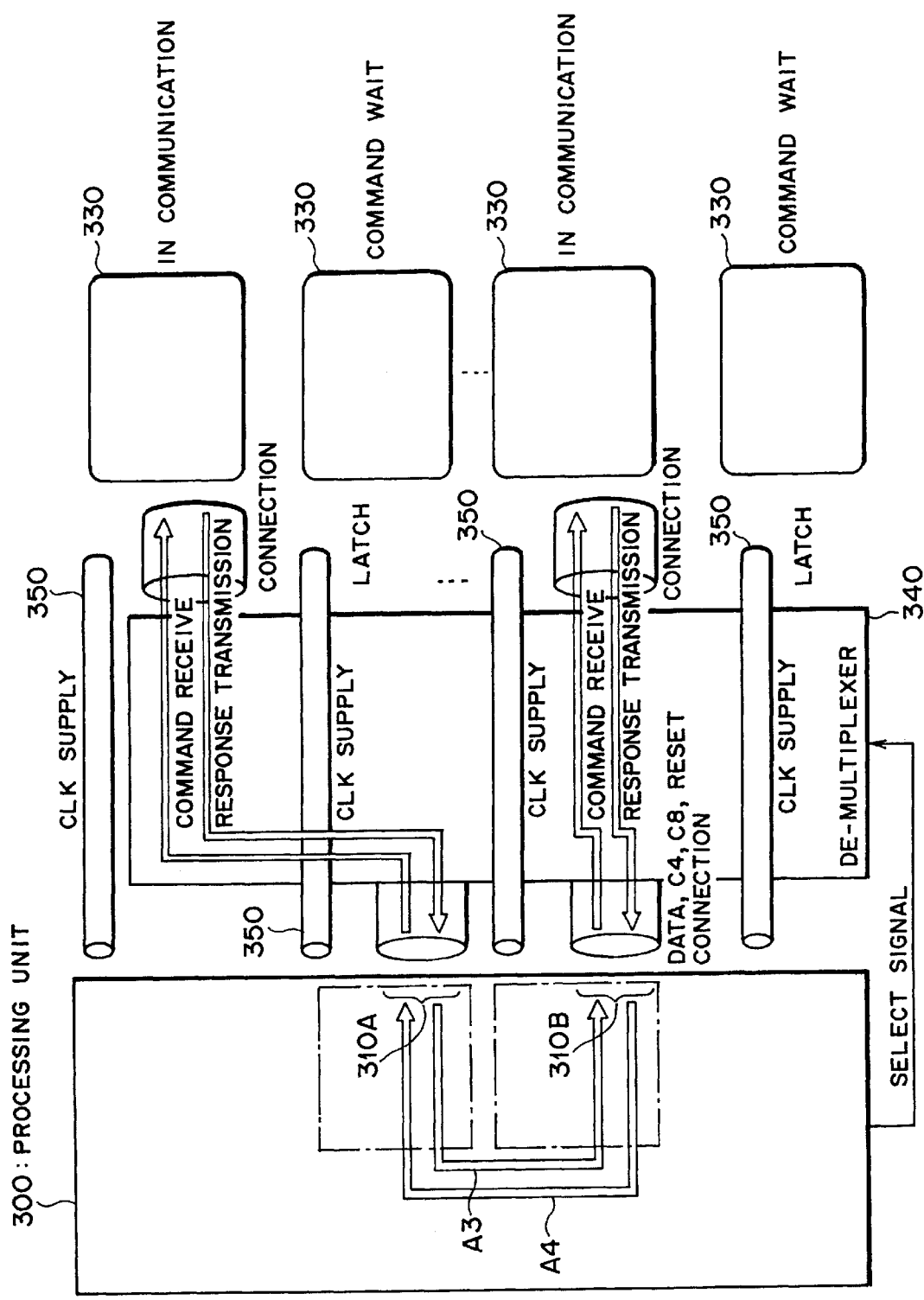
FIG. 1 is an illustration available for explaining an aspect of the present invention.

FIG. 1 is an illustration for describing an aspect of the present invention. As FIG. 1 shows, a data transfer control method according to this invention is a method for controlling data transfer between a plurality of portable type mediums 330 and a processing unit 300 capable of gaining access to these portable type mediums 330, and is made to connect the plurality of portable type mediums 330 through a demultiplexer 340 to one or more (in FIGS. 1, 2) portable type medium ports 310A, 310B provided in the processing unit 300, with the number of the portable type mediums 330 being larger than the number of portable type medium ports, so that the demultiplexer 340 selectively switches, of the plurality of portable type mediums 330, the mediums 330 to be accessed by the processing unit 300 and the ports 310A, 310B.

Furthermore, as shown in FIG. 1, a data transfer control system according to this invention is interposed between a plurality of portable type mediums 330 and a processing unit 300 capable of gaining access to these portable type mediums 330 for controlling data transfer between the plurality of portable type mediums 330 and the processing unit 300, and is equipped with a demultiplexer 340 capable of making connection between one or more portable type medium ports 310A, 310B in the processing unit 300 and the plurality of portable type mediums 330 whose number is larger than the number of the ports 310A, 310B, with this demultiplexer 340 selectively switching, of the plurality of portable type mediums 330, the mediums 330 to be accessed by the processing unit 300 and the ports 310A, 310B for the connection therebetween.

Besides, as shown in FIG. 1, control clocks to be used for the plurality of portable type mediums 330 are supplied from the processing unit 300 through clock signal lines (CLK Supply) 350, whose number is identical to the number of the portable type mediums 330, to the plurality of portable type mediums 330, respectively. Further, the plurality of portable type mediums 330 share (use in common), through the demultiplexer 340, data transfer signal lines [for example, data lines (Data), C4 signal lines (C4), C8 signal lines (C8), reset signal lines (Reset), and other lines] provided to the ports 310A, 310B on the processing unit 300 side.

In addition, it is also appropriate that the system latches the states of signals to, of the plurality of portable type mediums 300, the mediums 300 to which the processing unit 300 is not to gain access (mediums which are not to be accessed). Thus, the data transfer control system according to this invention may be provided with a latch circuit.

At this time, a select signal for selecting and designating, as the aforesaid mediums 330 to be accessed, the portable type mediums 330 to be connected to the ports 310A, 310B is supplied from the processing unit 300 to the demultiplexer 340 to place this demultiplexer 340 into switching operation, while the portable type mediums 330 which have not been selected and designated by the select signal are set as the aforesaid non-accessed mediums 330 (mediums which are not to be accessed) and the states of the signals to the non-accessed portable type mediums 330 are latched immediately before the transition thereof to the no-access conditions.

Moreover, it is also appropriate that the aforesaid select signal, set to a specific signal state, from the processing unit 300 is used as reset instruction signals for the demultiplexer 340 and the aforesaid signal state latching operation (latch circuit) or that the aforesaid select signal, set to a specific signal state, from the processing unit 300 is used as latch instruction signals for latching all the states of signals to the plurality of portable type mediums 330.

Incidentally, in fact, in the processing unit 300, a portable type medium control circuit (not shown) is provided for each of the ports 310A, 310B, and each of the portable type medium control circuits operates in response to an instruction from a processing section (CPU or the like; not shown) in the processing unit 300, thereby accomplishing the access from the processing unit 300 to each of the portable type mediums 330. At this time, upon receipt of a command from each of the portable type medium control circuits, each of the portable type mediums 330, which is in communication, transmits a response to that command to each of the portable type medium control circuits. The portable type mediums 330 being out of communication (non-accessed mediums) assume a command waiting condition.

Still further, in the example shown in FIG. 1, the two portable type medium:control circuits simultaneously operate in response to instructions from the aforesaid processing section in the processing unit 300 in a state where the plurality of portable type mediums 330 are in connection with the processing unit 300, thereby achieving the access to the two portable type mediums 330 connected through the demultiplexer 340 to the two ports 310A, 310B. By simultaneously performing the access to the two portable type mediums 330 in this way, the processing unit 300 conducts the data transfer processing with respect to the two portable type mediums 330, 330 as indicated by arrows A3 and A4.

As described above, with the data transfer control method and the data transfer control system according to this invention, since the switching of the connection conditions between the ports 310A, 310B and the portable type mediums 330 is made through the use of the demultiplexer 340, the access to the portable type mediums 330, Whose number is larger than the number of the ports on the processing unit 300 side, becomes feasible, with the result that, in the case of increasing the number of portable type mediums 330 the processing unit 300 controls, it is possible to eliminate the need for increasing the number of ports or portable type medium control circuits on the processing unit 300 side.

Accordingly, the number of portable type mediums to be controlled can be increased without a rise of the manufacturing cost of the processing unit 300. Particularly, for the formation of the processing unit 300 into an integrated circuit, even if the number of portable type mediums to be controlled increases, there is no need to integrate a large number of lines or portable type medium control circuits at high density, which contributes significantly to the reduction of manufacturing cost and circuit scale.

In addition, the latching of the states of signals to the non-accessed portable type mediums 330 can surely prevent the states of signals to these portable type mediums 330 from varying and becoming unstable immediately after the switching of the portable type mediums 330 from the non-accessed condition to the accessed condition.

Still additionally, since this system is designed to reset the operation of the demultiplexer 340 and the signal state latching operation using the select signal from the processing unit 300 or to latch all the states of signals to a plurality of portable type mediums 330 using the select signal from the processing unit 300, the operation of the demultiplexer 340 and the latch states are easily controllable according to various situations.

Figure 2:
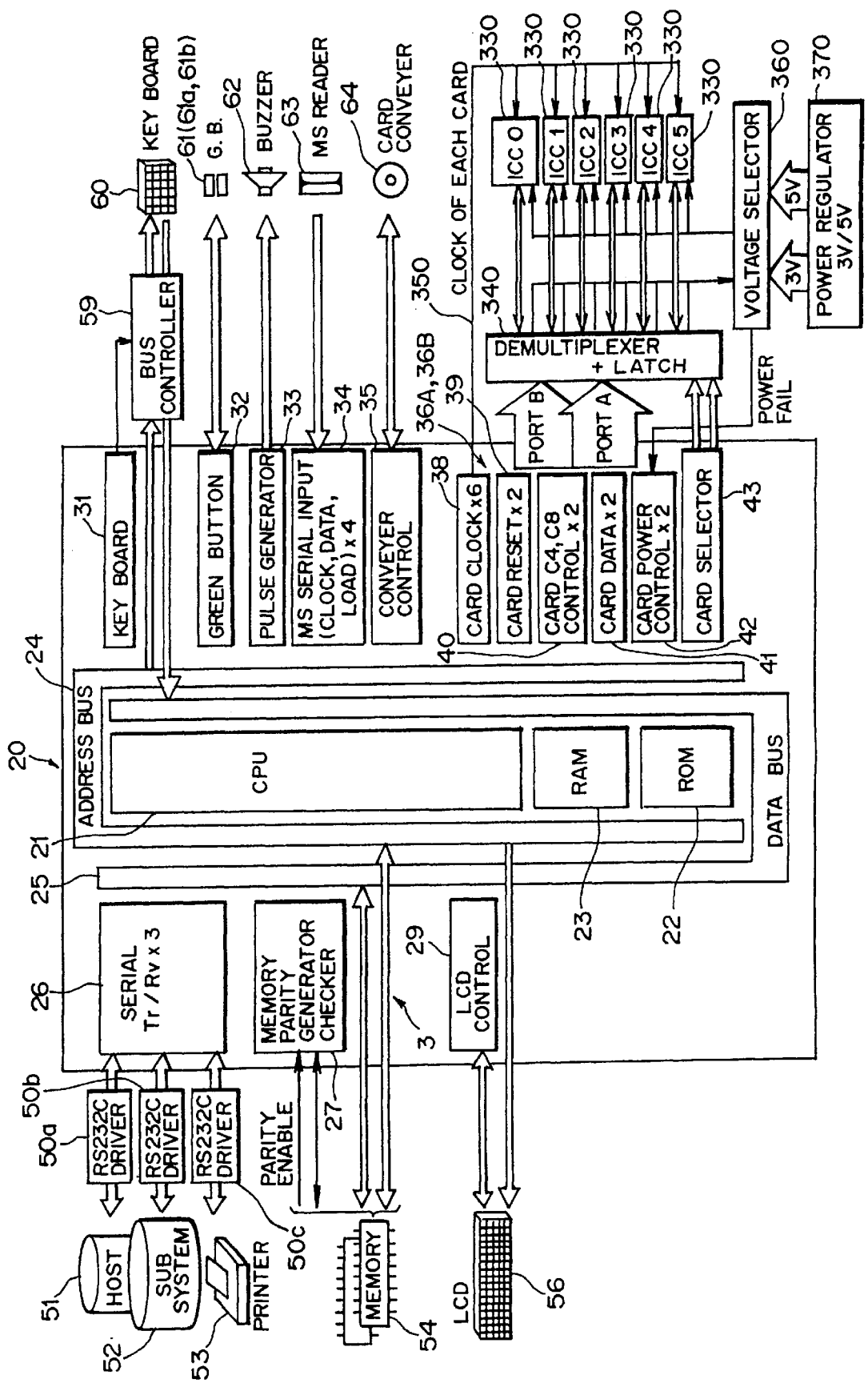
FIG. 2 illustratively shows an example of configuration of a digital money control integrated circuit (protocol controller) involving this invention.

[1] Description of Digital Money Control Integrated Circuit (Protocol Controller) according to this Embodiment FIG. 2 illustratively shows a configuration of a digital money control integrated circuit (protocol controller) to which this invention is applied.

A digital money control integrated circuit 20 (which will be referred hereinafter to as a protocol controller) according to this embodiment, shown in FIG. 2, is designed. to be incorporated into transaction apparatus (for example, ATMs, ECRs, digital money load terminals, electronic purses, POS terminals, handy POSs, POS servers, and others) handling digital money defined as a symbol of electronic currency, and to be used in common. Its detailed configuration will be described hereinbelow with reference to FIG. 2.

The protocol controller 20 has a configuration in which integrated on one chip are a CPU 21, a ROM 22, a RAM 23, an address bus 24, a data bus 25 and an interface circuit 3, along with circuits 26, 27, 29, 31 to 35, 36A, 36B, 38, 42 and 43, serving as peripheral control circuits, which will be described herein later.

Figure 4:
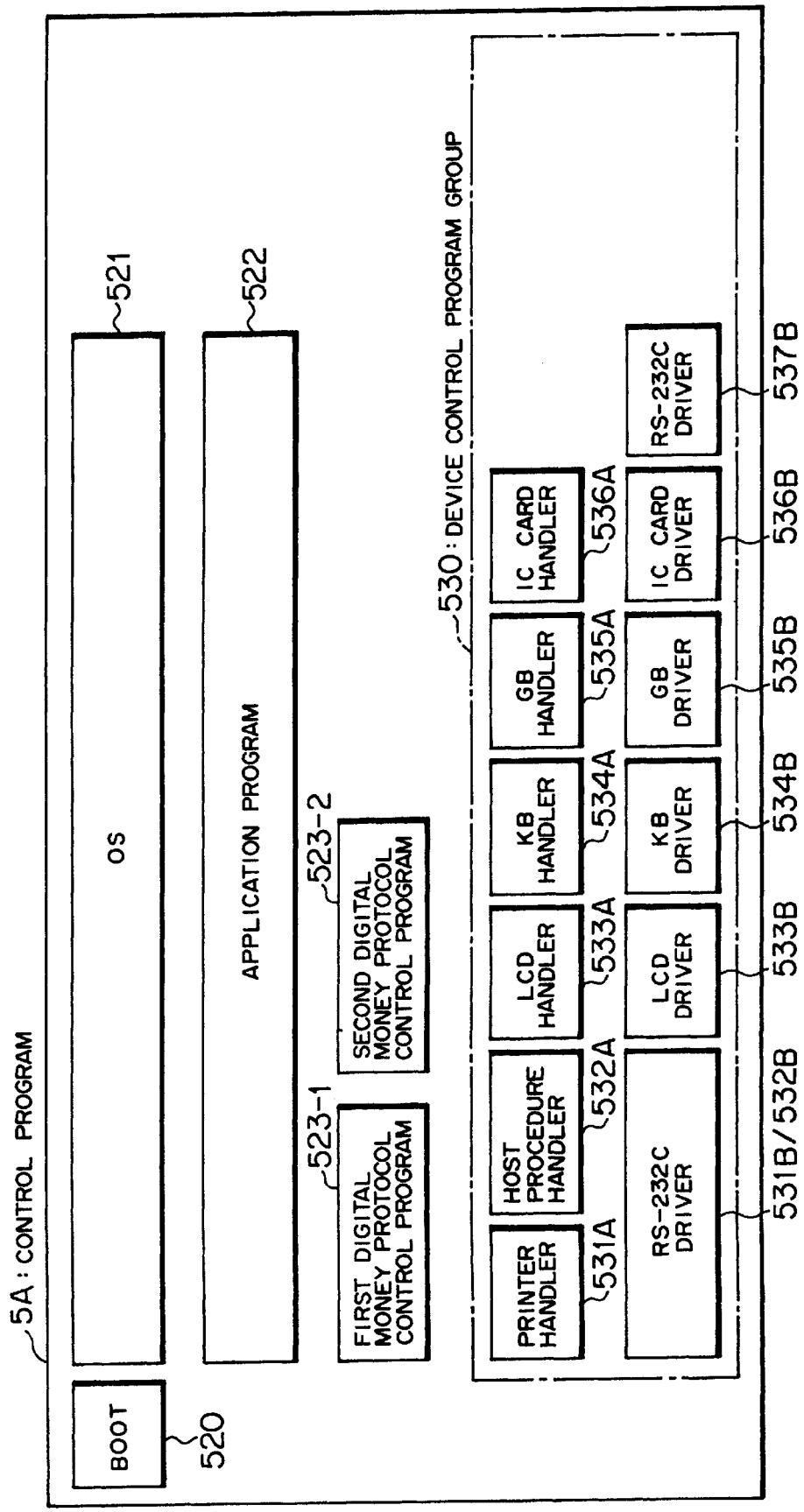
FIG. 4 is a block diagram showing a structure of a control program in the protocol controller according to this embodiment.
Figure 6:
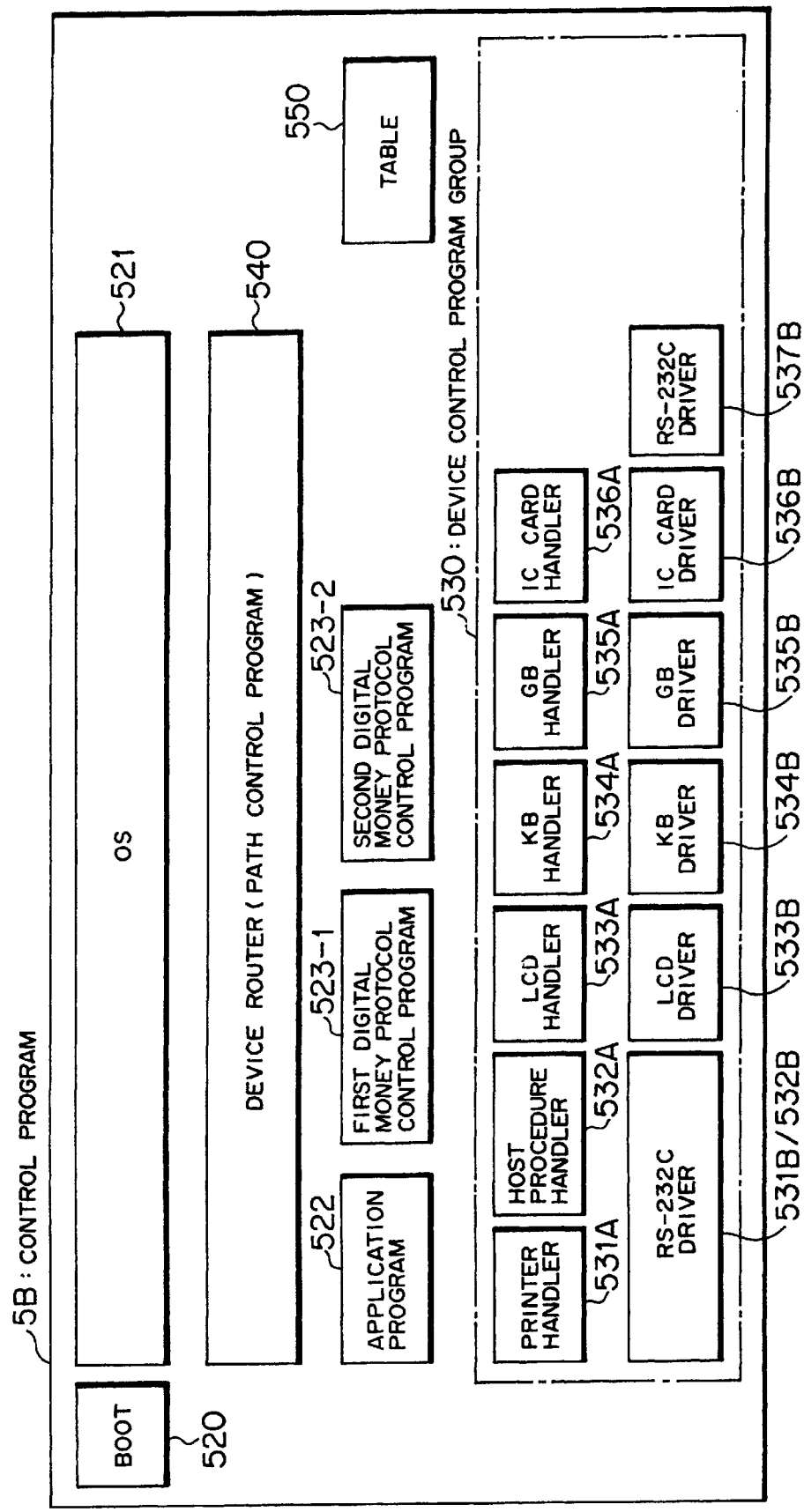
FIG. 6 is a block diagram showing another example of configuration of a control program in the protocol controller according to this embodiment.

The ROM (storage section) 22 is for storing a control program 5A or 5B prepared for protocols for a plurality of digital money different in mode (see FIG. 4 or 6). The structures of the control programs 5A and 5B will be described herein later with reference to FIGS. 4 and 6, respectively.

Besides, in this embodiment, in order to cover two modes of digital money as first and second digital money, respectively, each of the control programs 5A, 5B is produced in corresponding relation to a protocol for each of the digital money.

Additionally, logical cutoff takes place between the ROM 22 and an external connection terminals of the protocol controller 20, and the control programs 5A, 5B are written at the time of the fabrication of the protocol controller 20. That is, the ROM 22 in the protocol controller 20 according to this embodiment is constructed in the form of a mask ROM.

The CPU (processing section) 21 is for controlling the treatments of the first digital money and the second digital money by controlling the operations of various types peripheral control circuits mounted on the protocol controller 20 through the execution of the control program 5A or 5B stored in the ROM 22.

The RAM 23 is to be used as a working area of the CPU 21, or for other purposes.

The interface circuit 3 is connected to an external circuit, such as an external storage sectionor an external memory (external storage section) 54 to perform an interface function between this external circuit and the CPU 21. In the case of FIG. 2, the external memory 54 is connected as the external circuit to the protocol controller 20. In this instance, as the external memory 54 to be connected thereto, for example, there are an exterior type ROM 54a, an exterior type RAM 54b, an FROM (FLASH ROM) 54c, and other memories (see FIG. 14). Incidentally, the exterior type ROM 54a is to be used as a program storing external storage section for storing a program, such as an OS.

The address bus 24 and the data bus 25 establish interconnections among the CPU 21, the ROM 22, the RAM 23, the interface circuit 3, and the circuits 26, 27, 29, 31 to 35, 36A, 36B, 38, 42 and 43, which will be described herein later, thereby effecting the interchange of addresses/data. The used address bus 24 is of a 24-bit type, while the used data bus 25 is of a 16-bit type.

Each of the peripheral control circuits, provided in the protocol controller 20 according to this embodiment, is for fulfilling a control function related to the digital money processing. Concretely, such circuits 26, 27, 29, 31 to 35, 36A, 36B, 38, 42 and 43 are provided as the peripheral control circuits.

Each of serial transmission/receive control circuits (communication control circuits) 26 operates under control of the CPU 21 and the control programs 5A, 5B, and is for controlling communications with external units (for example, a host system 51, a sub-system 52, a printer 53, and others). The protocol controller 20 according to this embodiment is equipped with three communication ports (see P0, P1 and P2 in FIG. 8), and is provided with three serial transmission/receive control circuit (Serial Tr/Rv) 26 respectively corresponding to the three ports.

Besides, the transmission/receive between each of the serial transmission/receive control circuits 26 and each of three external units (the host system 51, the sub-system 52 and the printer 53) is done through each of RS232C drivers 50a to 50c. Further, the host system 51 is, for example, an ATM, a POS terminal, or the like, while the sub-system 52 is, for example, another IC card reader/writer, or the like, and even, the printer 53 is, for example, for printing receipts. Additionally, programs (device control programs, a communication control program) for controlling the serial transmission/receive control circuits 26 involve a printer handler 531A, a HOST procedure handler 532A and RS232C drivers 531B/532B, 537B in the control program 5A or 5B (see FIG. 4 or 6).

A memory parity generator checker 27 is for performing parity check in the external memory 54 (RAM 43b) connected to the protocol controller 20 while undergoing control of the CPU 21 and the control programs 5A, 5B.

An LCD control circuit (display control circuit) 29 is for controlling a controller built-in type LCD (Liquid Crystal Display) 56, serving as a display unit connected to the protocol controller 20, while undergoing control of the CPU 21 and the control programs 5A, 5B. Control programs (device control programs) for controlling this LCD control circuit 29 involve an LCD handler 533A and an LCD driver 533B in the control program 5A or 5B (see FIG. 4 or 6).

A keyboard control circuit (input control circuit) 31 is for conducting input processing of a signal from a keyboard (KB) 60, serving as an input device, through a bus control circuit 59 under control of the CPU 21 and the control programs 5A, 5B. Programs (device control programs) for controlling this keyboard control circuit 31 include a KB handler 534A and a KB driver 534B in the control program 5A or 5B (see FIG. 4 or 6).

A green button control circuit (input control circuit) 32 works under control of the CPU 21 and the control programs 5A, 5B to conduct input processing of a signal from a green button (GB) 61, being an input unit connected to the protocol controller 20, and additionally to execute control on lighting/lighting-out of this green button 61 and others. Programs (device control programs) for controlling this green button control circuit 32 include a GB handler 535A and a GB driver 535B in the control program 5A or 5B (see FIG. 4 or 6). Incidentally, the green button 61 actually comprises two buttons 61a, 61b, which are for confirming whether or not the user has an intention to render a payment of the utilization of digital money or the like, and which are controlled to light in green when urging the user for operation.

A pulse generator (display control circuit) 33 operates under control of the CPU 21 and the control programs 5A, 5B to generate a pulse signal for actuating a buzzer 62 acting as a display unit to be coupled to the protocol controller 20, thereby making the buzzer 62 sound.

MS serial input control circuits 34 work under control of the CPU 21 and the control programs 5A, 5B to conduct input processing of a signal from a magnetic stripe reader (MS reader) 63 serving as an input unit to be connected to the protocol controller 20, with the protocol controller 20 according to this embodiment being equipped with four MS serial input control circuits 34 for dealing simultaneously with MS read data corresponding to four tracks.

A card conveyer control circuit 35 is subjected to control of the CPU 21 and the control programs 5A, 5B, and is for controlling the operation of a card conveyer 64 to be connected to the protocol controller 20. Incidentally, the card conveyer 64 is for conveying IC cards 330, for example, in an IC card reader/writer.

IC card control circuits (medium control circuits) 36A, 36B undergo control of the CPU 21 and the control programs 5A, 5B to execute control related to the IC cards (portable type mediums) 330 accommodating digital money. In the protocol controller 20 according to this embodiment, two ports A and B are prepared for purpose of directly dealing with two IC cards 330, while the two IC card control circuits 36A, 36B are provided in terms of these ports A, B, respectively. Programs (device control programs) for controlling these IC card control circuits 36A, 36B involve an IC card handler 536A and an IC card driver 536B in the control program 5A or 5B (see FIG. 4 or 6). Incidentally, the IC cards are based upon, for example, ISO7816.

Each of these IC card control circuits 36A, 36B is composed of a card reset control circuit 39, a card C4/C8 control circuit 40 and a card data input/output control circuit 41.

The two ports A, B in the protocol controller 20 are, as data transfer signal lines, equipped with a data line, a C4 signal line, a C8 signal line and a reset signal line (one for each). The card reset control circuit 39 is for controlling a reset signal to be outputted through the aforesaid reset signal line to the IC card 330, while the card C4/C8 control circuit 40 is for output-controlling a C4/C8 signal to the IC card 330 through the C4 signal line or the C8 signal line, and is further for input-controlling the C4/C8 signal from the IC card 330 therethrough, and even the card data input/output control circuit 41 is for executing serial output control of data to the IC card 330 through the aforesaid data line, and is additionally for performing serial input control of data from the IC card 330 therethrough.

In addition, in this embodiment, a demultiplexer 340 intervenes between the protocol controller 20 and the IC cards 330, whereby the protocol controller 20 has a feature to control a maximum of six IC cards 330 through the use of the two ports A, B, that is, the two IC card control circuits 36A, 36B. Besides, in FIG. 4, the six IC cards 330 are represented with ICC0 to ICC5, respectively, with the ICC0 to ICC5 being respectively set in the actual card ports to which port numbers 0 to 5 are assigned (which will be referred hereinafter to as ports 0 to 5).

The demultiplexer 340 functions as a data transfer control unit (card switch) to establish proper connections between the six IC cards 330 and the IC card control circuits 36A, 36B (ports A, B) of the protocol controller 20 for the data transfer therebetween, that is, to selectively switch the two IC cards 330 to be accessed by the protocol controller 20 and the ports A, B to make connections therebetween.

Figure 20:
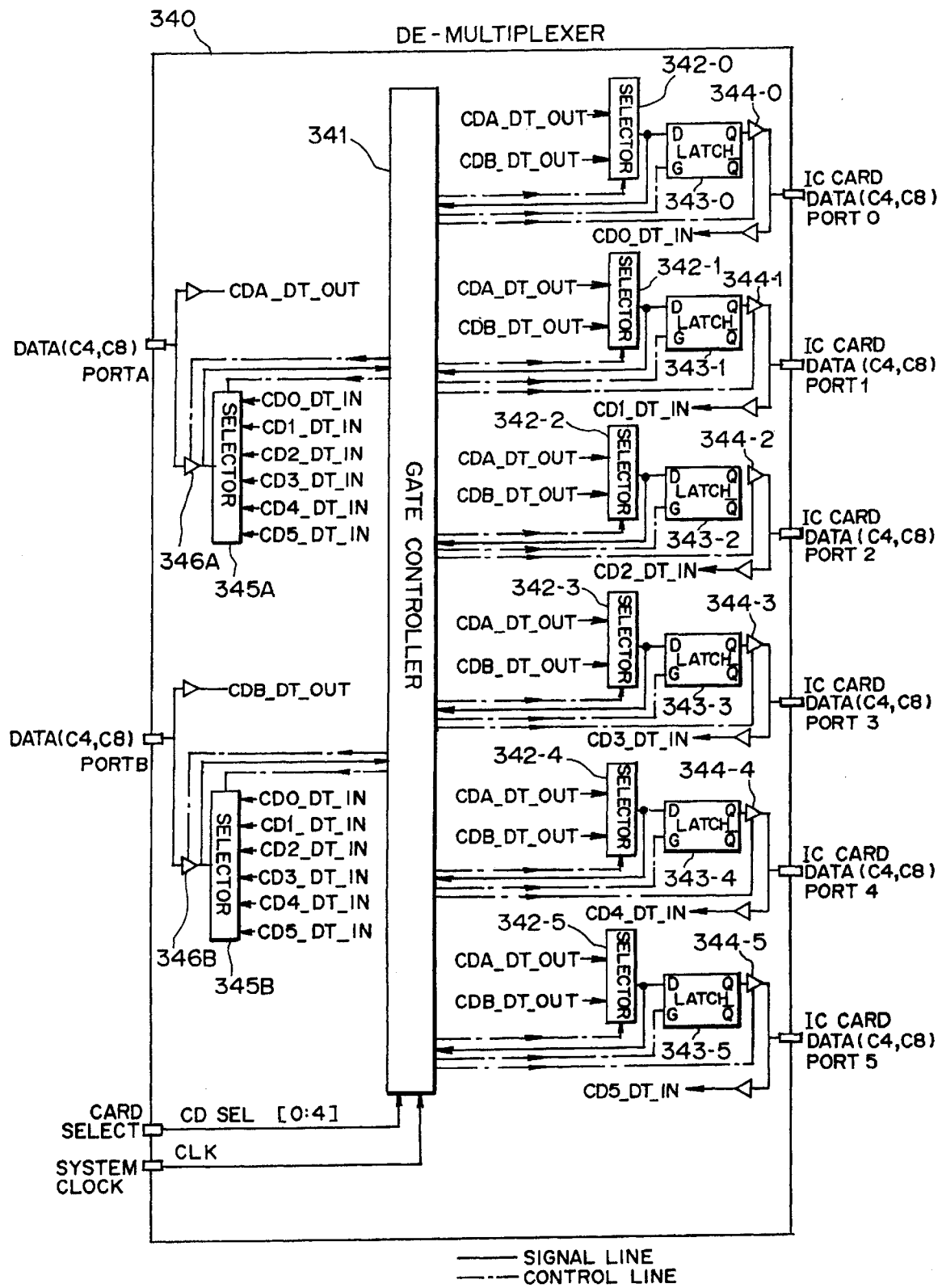
FIGS. 20 to 22 are block diagrams each showing a configuration of a demultiplexer (data transfer control unit) provided between the protocol controller and an IC card, in this embodiment.
Figure 21:
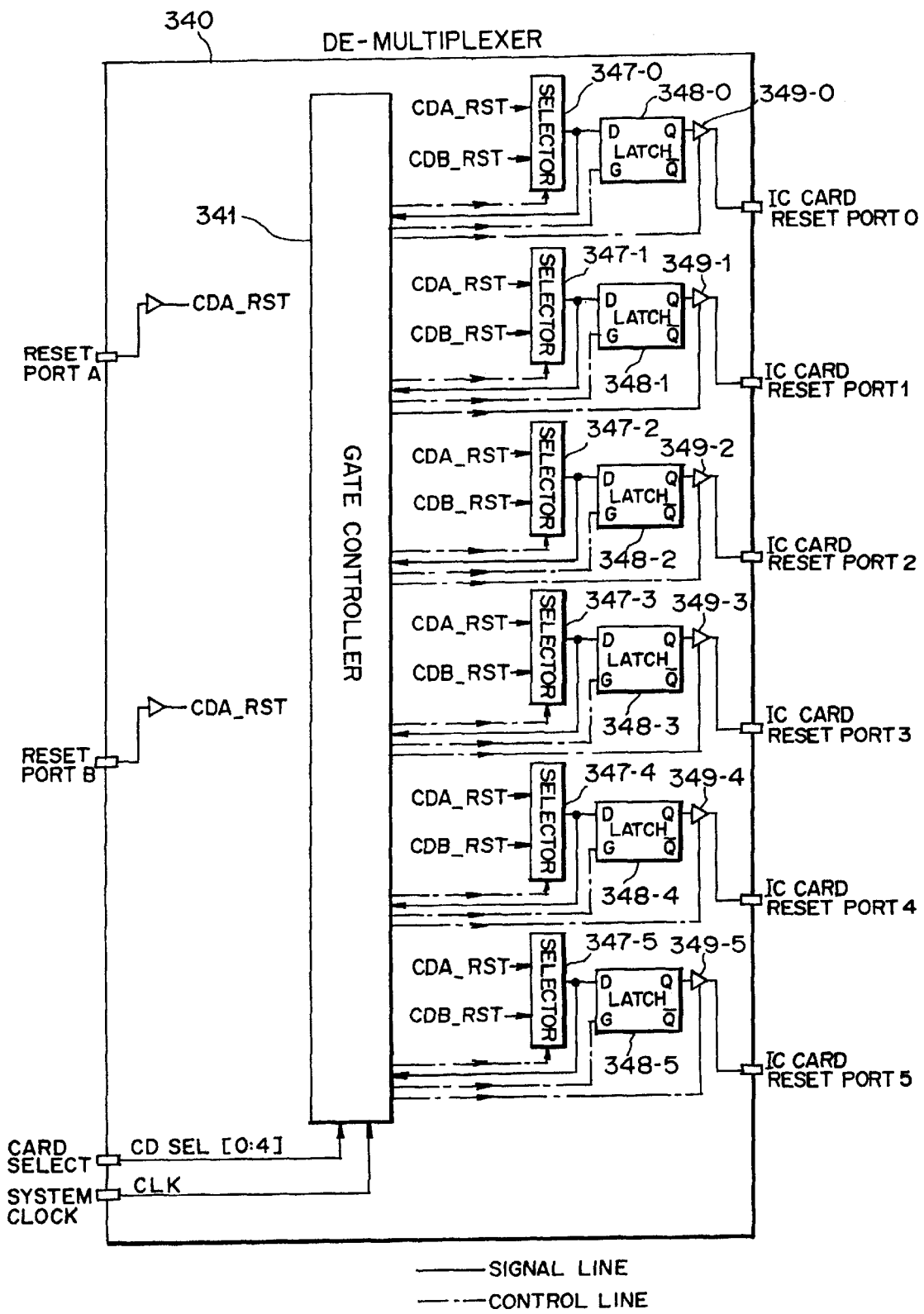

In addition, the demultiplexer 340 includes latch circuits 343-0 to 343-5 and 348-0 to 348-5 for latching the states of signals (data, C4/C8 signals, reset signals) to the IC cards 330 (non-accessed objects), which are not to be accessed, in the protocol controller 20 (see FIGS. 20 and 21). Incidentally, a detailed and concrete configuration of the demultiplexer 340 will be described herein later with reference to FIGS. 20 to 22.

Moreover, the protocol controller 20 is provided with a card selector 43 which is for supplying the demultiplexer 340 with a select signal which selects and specifies the IC card 330 to be connected to each of the ports A, B as an object to be accessed, for accomplishing the switching operation of the demultiplexer 340. The IC cards 330, which are not selected by the select signals from the card selector 43, are treated as non-accessed objects, and the states of signals to the non-accessed IC cards 330 are made to be latched in the latch circuits 343-0 to 343-5 and 348-0 to 348-5 immediately before the transition to the no-access situations.

Besides, the card selector 43 is made to set a select signal through the use of an IC card port allocation register (see FIG. 24), and to output that select signal to the demultiplexer 340. The details of the select signal will be described herein later with reference to FIGS. 24 and 25. Further, the concrete switching operation of the demultiplexer 340 to be caused by the select signal will be described herein later with reference to FIGS. 26 and 27.

Each of card clock generators 38 is for generating a clock signal (control clock) to be supplied through a clock signal line 350 to each of a maximum of six IC cards 330 connectable to the protocol controller 20 according to this embodiment, with the number thereof being equal to the maximum number (that is, 6) of IC cards 330 to be put into connection.

In this way, according to this embodiment, the clock signals to be used for the respective IC cards 330 are fed through the clock signal lines 350, whose number is the same as the number of IC cards 330 (that is, it assumes 6), to the IC cards 330, while the six IC cards 330 share, through the demultiplexer 340, the data transfer signal lines (the data line, the C4 signal line, the C8 signal line, the reset signal line, and others) installed in the two ports A, B of the protocol controller 20.

Furthermore, in this embodiment, the power supply to the respective IC cards 330 is effected through the use of a voltage selector 360 and a power regulator 370. In this case, the power regulator 370 is designed to generate and output two kinds of voltages: 3V and 5V, while the voltage selector 360 chooses one of 3V and 5V in accordance with an instruction from the demultiplexer 340 and supplies the chosen one to each of the IC cards 330. A detailed configuration of the power supply system including this voltage selector 360 will be described herein later with reference to FIG. 23.

Additionally, the protocol controller 20 includes two card power control circuits 42 each for generating a designating signal of the voltage 3V/5V to be supplied to the IC cards 330 and for outputting it to the demultiplexer 340. The signal from each of the card power control circuits 42 is sent via the demultiplexer 340 to the voltage selector 360 which in turn, performs the voltage switching operation in accordance with that signal. In addition, if the failure of the power supply to each of the IC cards 330 occurs for some reason, the voltage selector 360 is to inform the card power control circuits 42 of that fact (power fail).

Besides, although not illustrated in FIG. 2, IC card mounting notice lines are laid between the ports A, B of the protocol controller 20 and the ports 0 to 5 for the IC cards 330. As will be described herein later with reference to FIG. 22, the information representative of whether or not each of the IC cards (ICC0 to ICC5) 330 is mounted in each of the ports 0 to 5 goes through the corresponding IC card mounting notice line and the demultiplexer 340 to the IC card control circuits 36A, 36B.

The above-mentioned peripheral control circuits 26, 27, 29, 31 to 35, 36A, 36B, 38, 42 and 43 are not always connected to the above-described various devices, designated at the reference numerals 51 to 54, 56 and 59 to 64, for controlling these devices, but are previously incorporated into the protocol controller 20 to control these devices when needed. This contributes to the realization of an extremely high flexibility of the protocol controller 20 according to this embodiment.

[1-1] Description of Method for Identification of Exterior Type ROM Connection

Secondly, referring to FIG. 3, a description will be made hereinbelow of a method of identifying or checking whether or not the exterior type ROM (external ROM) 54a functioning as a program storing external storage section is in connection with the protocol controller 20 according to this embodiment. Incidentally, FIG. 3 illustrates the structure of an address space in the protocol controller 20 according to this embodiment.

According to this embodiment, the CPU 21 in the protocol controller 20 functions as an identification means to judge whether or not the exterior type ROM 54a is connected through the interface circuit 3 to the protocol controller 20. If this identification means judges that the exterior ROM 54a is in connection, the CPU 21 reads out a program (for example, OS) stored in this exterior type ROM 54a and starts it.

Figure 3:
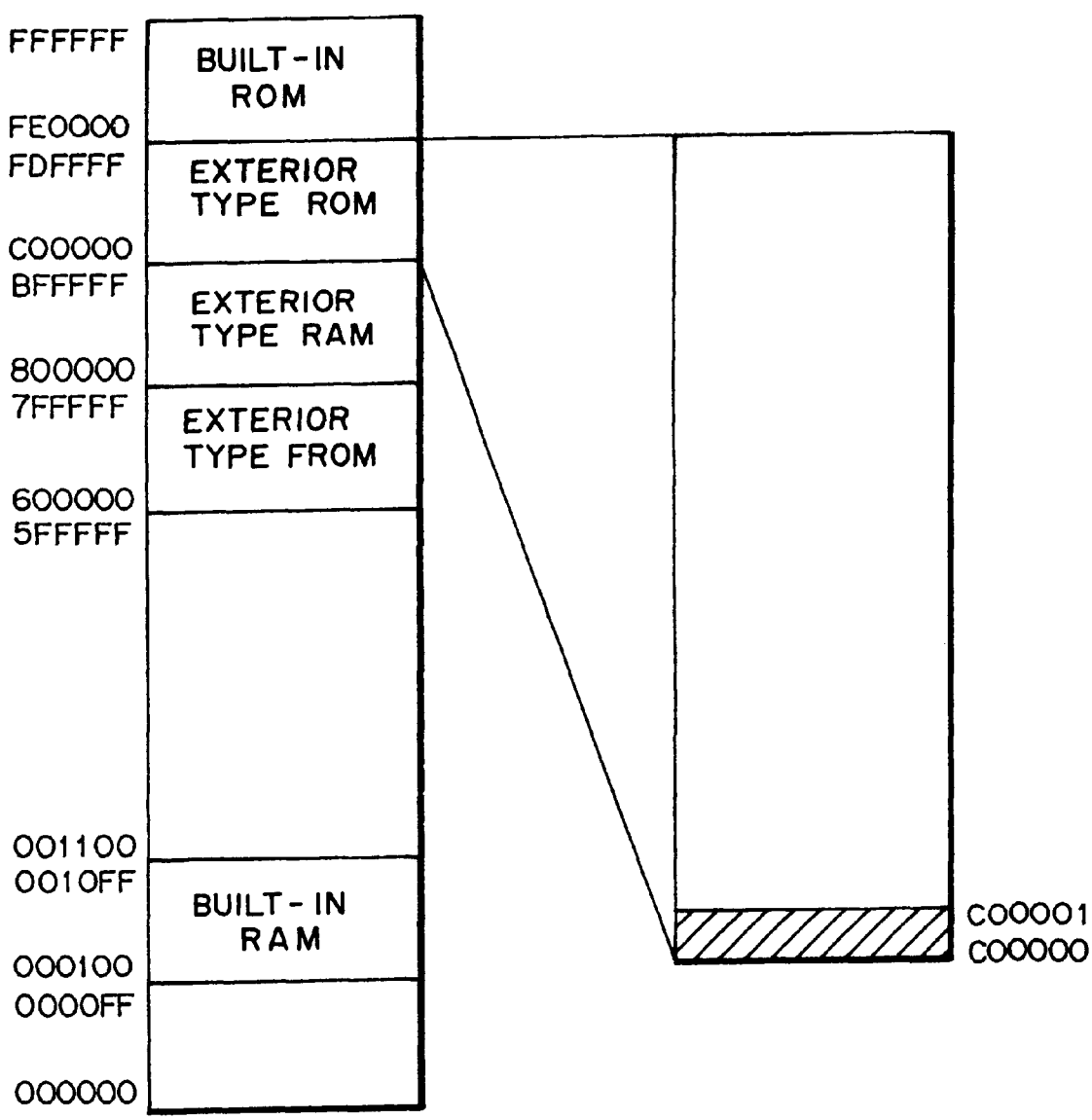
FIG. 3 is an illustration of a memory space structure in a protocol controller according to this embodiment, for describing a method of identifying an exterior type ROM (external ROM) according to this embodiment.

In this embodiment, for example, as shown in FIG. 3, the address space is allocated to the built-in ROM 22, the built-in RAM 23, the exterior type ROM 54a, the exterior type RAM 54b and, the exterior type FROM 54c. In the protocol controller 20 according to this embodiment, for example, addresses C00000 to EDFFFF are allocated to the exterior type ROM 54a.

In this case, 0x0000 is previously stored in the leading two bytes (a shaded portion in FIG. 3: addresses C00000 to C00001) of the exterior ROM 54a while, in the protocol controller 20, all the data signal lines of the data bus 25 to be connected to the exterior type ROM 54a are connected through a pull-up resistor to a high electric potential.

With this configuration, if only reading out the data at the logical addresses C00000 to C00001, the CPU 21 can identify the presence or absence of the exterior type ROM 54a. That is, in the case of the exterior ROM 54a being in connection, the CPU 21 reads out the data 0x0000 from the exterior type ROM 54a through the data bus 25. Conversely, in the case that no connection of the exterior type ROM 54a takes place, since all the data signal lines of the data bus 25 are pulled up, the CPU 21 performs the operation equivalent to reading out the data 0xffff.

Thus, in this embodiment, the CPU 21 can identify the connection/non-connection of the exterior type ROM 54a by judging whether the value obtained as the readout result from the logical addresses C00000 to C00001 is 0x0000 or 0xffff.

[1-2] Description of Control Program Structure

Furthermore, referring to FIG. 4, a description will be given hereinbelow of a control program structure in the protocol controller 20 according to this embodiment.

As shown in FIG. 4, the control program 5A to be stored in the ROM 22 is composed of a boot program (BOOT) 520, an OS (operating system) 521, an application program 522, a first digital money protocol control program 523-1, a second digital money protocol control program 523-2 and a group of device control programs 530.

The BOOT 520 is made to be initially put into activation for, starting the control program 5A, and it starts the OS 521.

The device control program group 530 functions as a plurality of device control programs for controlling external circuits connected to the interface circuit 3 and the peripheral control circuits noted before with reference to FIG. 2, and usually a pair of handler and driver organize one device control program. In this embodiment, the above-mentioned handlers 531A to 536A and drivers 531B to 537B for use as the device control programs.

The first digital money protocol control program 523-1 and the second digital money protocol control program 523-2 are for controlling the programs pertaining to the device control program group 530 in correspondence to two kinds of digital money, respectively.

The application program 522 is for controlling the programs pertaining to the device control program group 530 and the two kinds of protocol control programs 523-1 and 523-2.

[1-3] Description of Control Telegraphic Statement

Figure 5:
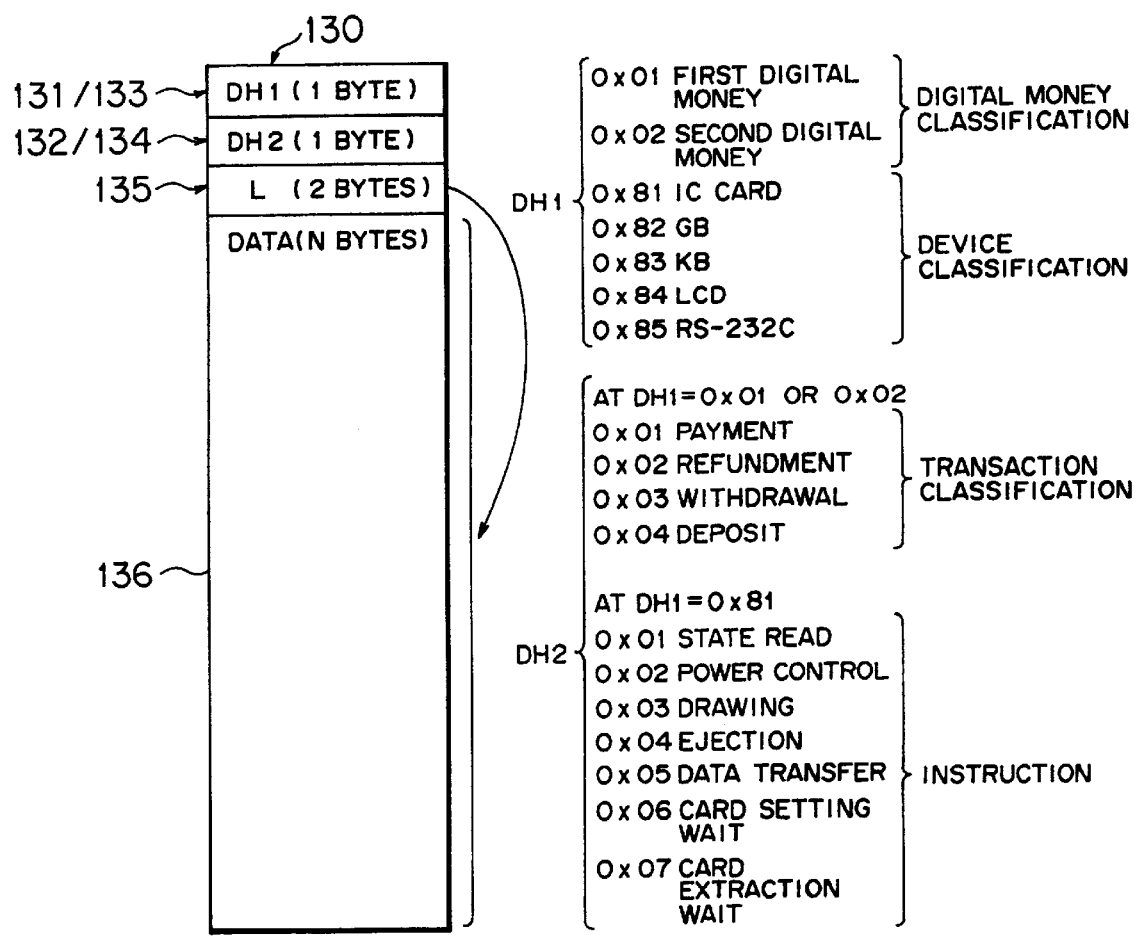
FIG. 5 is an illustration useful for explaining a configuration of a control telegraphic statement for use in the protocol controller according to this embodiment.

Referring to FIG. 5, a description will be taken hereinbelow of a configuration of a control telegraphic statement 130 for use in the protocol controller 20 according to this embodiment.

In the control program 5A in this embodiment, the application program 522 receives the control telegraphic statement 130, shown in FIG. 5, from an external unit, such as the host system 51 or the like, through the serial transmission/receive control circuit 26, and thereby controls the programs pertaining to the device control program group 530 and the two kinds of protocol control programs 523-1, 523-2 in accordance with the contents of that control telegraphic statement 130.

In this instance, as shown in FIG. 5, the control telegraphic statement 130 has an N-byte data field 136, and is for transferring data in a state of its being stored in the data field 136. To the data to be transferred, there are given a 1-byte data header DH1 and a 1-byte data header DH2 in addition to a data length field 135 denoting a length L of data stored in the data field 136 to be transferred.

In addition, in the case of the control telegraphic statement 130 in this embodiment, the data header DH1 is used as the digital money classification field 131 or the device classification field 133, while the data header DH2 is used as the transaction classification field 132 or the instruction field 134.

In this case, the specified data to be taken for when the data header DH1 is used as the digital money classification field 131 and the specified data to be taken for when it is used as the device classification field 133 assume values mutually exclusive of each other. When the data header DH1 is for use as the digital money classification field 131, the data header DH2 functions as the transaction classification field 132. Conversely, when the data header DH1 is for use as the device classification field 133, the data header DH2 acts as the instruction field 134.

More concretely, for example, as shown in FIG. 5, in the data header DH1, there are written 1-byte data "0x01", "0x02", "0x81", "0x82", "0x83", "0x84" and "0x85".

Of these 1-byte data, "0x01" and "0x02" are each for specifying a digital money classification, with "0x01" specifying the first digital money while "0x02" designating the second digital money. Accordingly, if "0x01" or "0x02" is written in the data header DH1, the data header DH1 functions as the digital money classification field 131.

In contrast with this, "0x81" to "0x85" specify an IC card, a GB (green button), a KB (keyboard), an LCD, an RS232C in the device classification, respectively; consequently, any one of "0x81" to "0x85" is written in the data header DH1, the data header DH2 has a feature as the device classification field 133.

Furthermore, in the case that "0x01" or "0x02" is written in the data header DH1, in the data header DH2, for example, there are written "0x01" to "0x04" which form 1-byte data for specifying the classification of the transaction to be done through the designated digital money. These data "0x01" to "0x04" accomplish the designation of transaction classifications, such as payment, refundment, withdrawal and deposit, respectively.

Still further, if any one of "0x81" to "0x85" is written in the data header DH1, then, in the data header DH2, for example, there are written "0x01" to "0x07" which produce 1-byte data for specifying instructions to the device designated. These data "0x01" to "0x07" accomplish the designation of instructions, such as state read, power control, drawing, ejection, data transfer, card setting wait and card extraction wait, respectively.

The application program 522, when the data header DH1 and the data header DH2 in the control telegraphic statement 130 it has received are respectively used as the digital money classification field 131 and the transaction classification field 132, makes the protocol control program 523-1 or 523-2 for the digital money specified by the digital money classification field 131 carry out the transaction designated by the transaction classification field 132.

On the other hand, when the data header DH1 and the data header DH2 in the control telegraphic statement 130 received are respectively used as the device classification field 133 and the instruction field 134, the application program 522 communicates the instruction described in the instruction field 134 to the device control program (a pair of handler/driver in the device control program group 530), which is for controlling the device specified by the device classification field 133, and makes it execute this instruction, while transmitting a response to the instruction from the device control program as a response telegraphic statement to the instruction issuer (that is, the issuer of the control telegraphic statement 130; for example, the host system 51) through the serial transmission/receive control circuit 26.

[1-4] Description of Another Structure of Control Program

Referring to FIG. 6, a description will be made hereinbelow of another example of control program structure in the protocol controller 20 according to this embodiment.

As shown in FIG. 6, the control program 5B to be put in the ROM 22 is based upon the addition of a device router (path control program) 540 and a table 550 to the control program 5A described above with reference to FIG. 4. In FIG. 6, the same numerals as those used above depict the same or substantially same parts, and the description thereof will be omitted for brevity.

In the following description, the programs pertaining to the device control program group 530, the application program 522 and the protocol control programs 523-1, 523-2 will sometimes be referred to as modules.

The device router (path control program) 540 is for providing a feature capable of establishing interconnections between the aforesaid modules. In the case of the use of the control program 5B to be described here, a peculiar module identifier is given to each of the modules in advance, and the device router 540 makes interconnections between the modules by using the module identifier of the connection-requesting module and the module identifier of the connection-accepting module as parameters, and produces the interchange of the control telegraphic statement 130, mentioned above, between these modules.

At this time, if the connection-accepting module belongs to an external unit (for example, the host system 51 or the like) connected through communication ports P0 to P2 of the protocol controller 20, the device router 540 makes the HOST procedure handler 532A or the RS232C drivers 531B/532B, 537B, serving as the communication control programs, control the serial transmission/receive control circuit 26, thereby making a connection between the connection-requesting module in the protocol controller 20 and the connection-accepting module in the external unit.

Figures 7A, 7B, 8:
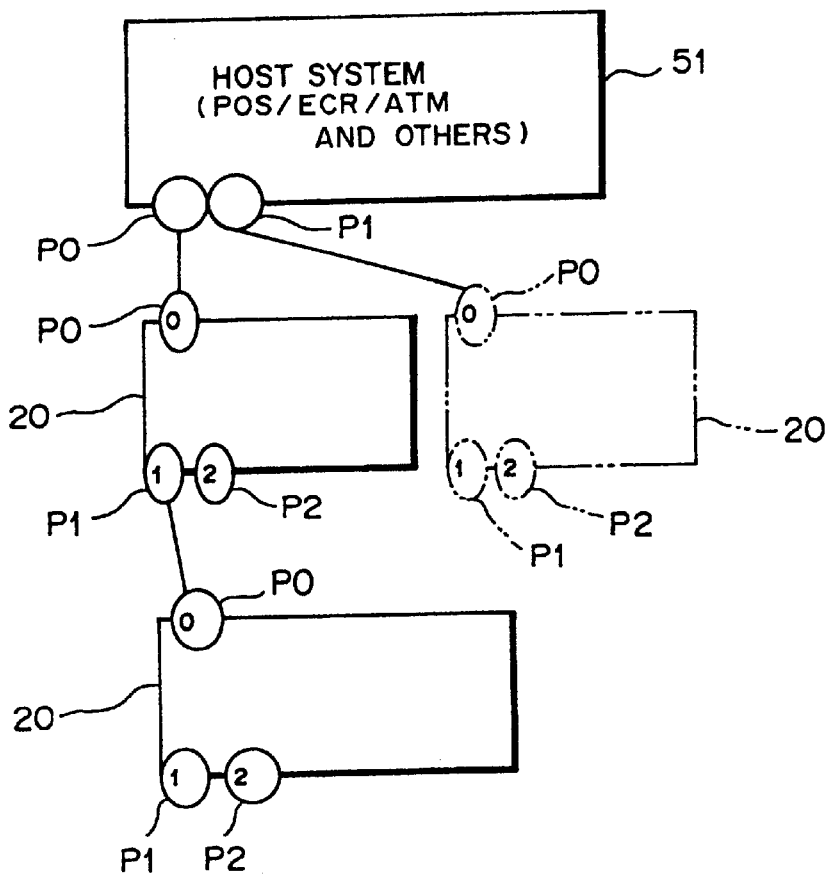
FIGS. 7A and 7B are illustrations each for describing the contents of a table retaining a correspondence between a module identifier and a path identifier in this embodiment.
FIG. 8 is an illustration of an example of cascade connection in the protocol controller according to this embodiment.

In this instance, it is also appropriate that, as shown in FIG. 8, the external unit to be connected to the protocol controller 20 to develop into the object of communication is a processing unit (for example, a personal computer) having the same ability as that of the protocol controller 20 according to this embodiment, or that it is another protocol controller 20 having the same configuration (ability) as that of the protocol controller 20 according to this embodiment, which is incorporated into a transaction apparatus.

Furthermore, in the case that, as shown in FIG. 8, a plurality of protocol controllers 20 are connected in a cascade fashion from the host system 51, such as POS/ECR/ATM, through the use of the three communication ports P0 to P2 of the protocol controller 20, the interface function of the device router 540 also permits the intercommunications among these protocol controllers 20 and host system 51.

If the protocol controller 20 is to be communicably connected to an external unit (a processing unit or another protocol controller 20) having a module, a peculiar module identifier is assigned to even the module pertaining to the external unit and capable of being an object of communication, while the protocol controllers 20 and the external units are also provided with a device router 540 and a peculiar path identifier (which enables the identification of the connection-accepting module) is given thereto in advance. In this case, the device router 540 sets up interconnections between the modules by using, as the parameters, the module identifier of the connection-requesting module, the module identifier of the connection-accepting module and the path identifier of the unit to which the connection-accepting module pertains.

In this embodiment, in order to make the interconnections between the modules through the use of the module identifiers and the path identifier as mentioned above, the control program 5B contains the table 550 retaining the correspondence between each of the module identifiers and each of the path identifiers indicative of the units to which the module-identifier given modules pertain. The contents of this table 550 depend upon the configuration of hardware (system) to be built in the protocol controller 20. In this system, a table 550 having the same contents is placed in all the units (protocol controllers 20 or processing units) interconnected communicably and equipped with a built-in device router 540.

The concrete contents of this table 550 are shown in FIGS. 7A and 7B.

In the case that a plurality of protocol controllers are cascade-connected as shown in FIG. 8, a correspondence among the path identifier of each of the protocol controllers, the path identifier of the host protocol controller connected to that protocol controller, and the communication port number (the definition of the protocol controller arrangement) is retain in the table 550 as shown in FIG. 7A.

The contents of the table 550 as shown in FIG. 7A signify the following arrangement. That is, the protocol controller having the path identifier #90 forms a root (ROOT), while the protocol controller with the path identifier #01 is connected to the port #1 in the protocol controller with the path identifier #90, the protocol controller with the path identifier #02 is connected to the port #1 in the protocol controller with the path identifier #01, the protocol controller with the path identifier #03 is connected to the port #2 in the protocol controller with the path identifier #01, the protocol controller with the path identifier #04 is connected to the port #1 in the protocol controller with the path identifier #02, and the protocol controller with the path identifier #05 is connected to the port #2 in the protocol controller with the path identifier #02.

In addition, as shown in FIG. 7B, a correspondence between an module identifier given to each of all modules, a plurality of protocol controllers include, and the path identifier of the protocol controller, to which that module pertains, [the definition of module identifiers (device numbers)] is retained together with its module name (or a name of a device controlled by the module) in the table 550.

As seen from the contents of the table 550 as shown in FIG. 7B, the module with the module identifier #01 pertains to the protocol controller with the path identifier #01, the module (device name: ICCRW01) with the module identifier #02 pertains to the protocol controller with the path identifier #02, the module (device name: ICCRW02) with the module identifier #03 belongs to the protocol controller with the path identifier #02, the module (device name: LCD) with the module identifier #20 belongs to the protocol controller with the path identifier #01, and the module (device name: KEY) with the module identifier #21 belongs to the protocol controller with the path identifier #01.

Such contents (the aforesaid correspondence) residing in the table 550 can be set/altered by the CPU 21 on the basis of a telegraphic statement the serial transmission/receive control circuit 26 receives. Further, it is also possible that the table 550 is stored in the external memory 54 connected through the interface circuit 3, in place of being put in the control program 5B.

In this embodiment, the device router 540, when making a connection between the modules, retrieves the contents of the table 550 (in this case, the contents shown in FIG. 7B) in relation to the module identifier of the connection-accepting module for obtaining the path identifier corresponding to the module identifier of the connection-accepting module.

If the path identifier obtained through the retrieval coincides with its own path identifier, because this means that the connection-requesting module and the connection-accepting module pertain to the same protocol controller 20, the device router 540 sets up the interconnection between these modules in the protocol controller 20. Conversely, if the path identifier obtained through the retrieval does not coincide with its own path identifier, the device router 540 judges that the connection-accepting module belongs to a different protocol controller, and, hence, retrieves the contents of the table 550 (in this case, the contents shown in FIG. 7A) in relation to that path identifier for first recognizing the connection status of the different protocol controller, and then controls the serial transmission/receive control circuit 26 through the use of the HOST procedure handler 532A and the RS232C drivers 531B/532B, 537B, thereby establishing the connection between the connection-requesting module in the protocol controller 20 and the connection-accepting module in the different protocol controller.

Besides, if processing units (a), (b) of a personal computer or the like, having the following configurations, are connected as external units to the protocol controller 20 according to this embodiment, communications are possible between these processing units (a), (b) and the protocol controller 20.

The processing unit (a) is made up of a CPU, a memory for storing a control program 5B similar to that mentioned before, and a communication control circuit for controlling communications with an external unit (in this case, a protocol controller 20), with this control program 5B being composed of at least a communication control program for the communication control circuit (comprising equivalents to the HOST procedure handler 532A and the RS232C drivers 531B/532B, 537B noted above), a path control program with a peculiar path identifier (an equivalent to the device router 540 noted above), and modules with peculiar module identifiers (an application program, a protocol control program, device control programs, and others). Where such a processing unit (a) is connected to a protocol controller 20, the communications between the processing unit (a) and the protocol controller 20 is completely the same as the interconnections between two protocol controllers 20.

The processing unit (b) is made up of a CPU, a memory for storing a program 5, and a communication control circuit for controlling communications with an external unit (in this case, a protocol controller 20), with this memory storing at least a communication control program for controlling the communication control circuit and an application program capable of issuing requests for connections to various types of modules within the protocol controller 20, being in connection with the communication control circuit, to the device router 540 in the protocol controller 20. Where such a processing unit (b) is connected to a protocol controller 20, when receiving a connection request from the processing unit (b), the device router 540 of the protocol controller 20 makes a connection between the corresponding module in the protocol controller 20 and the processing unit (b).

[1-5] Description of Example of Transaction Processing by Protocol Controller

Figure 9:
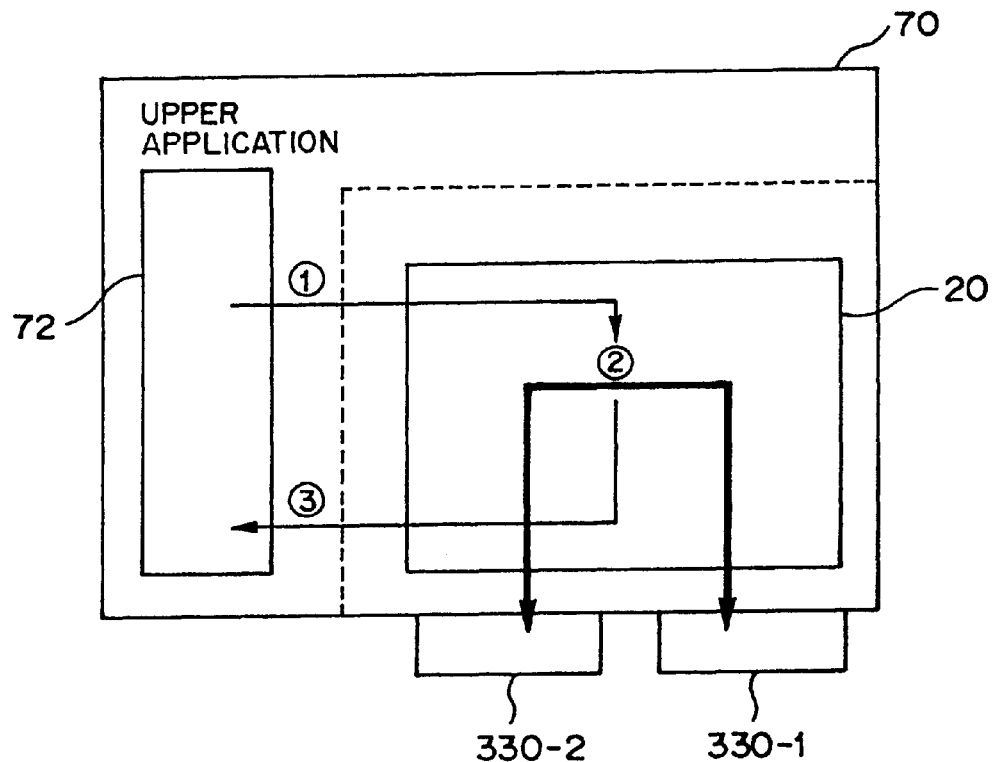
FIG. 9 is an explanatory view illustrating one example of transaction processing to be conducted through the use of the protocol controller according to this embodiment.
Figure 10:
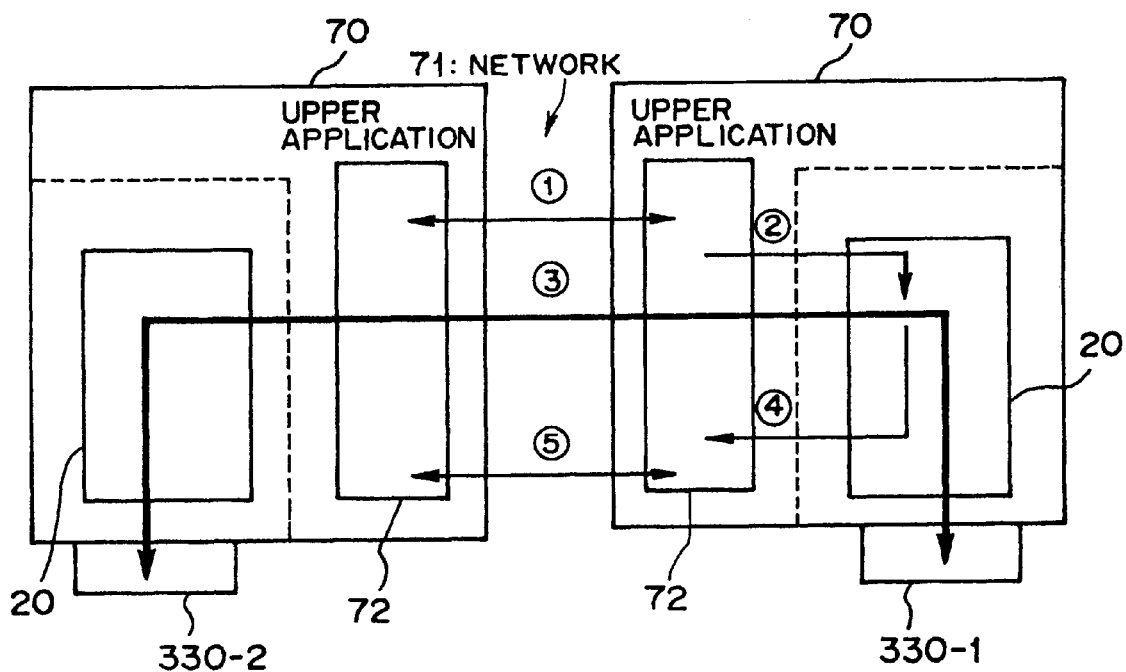
FIG. 10 is an explanatory view illustrating another example of transaction processing to be conducted through the use of the protocol controller according to this embodiment.

Referring to FIGS. 9 and 10, a description will be made hereinbelow of an example of transaction processing using the protocol controller 20 according to this embodiment.

In the example as shown in FIG. 9, a digital money (IC card) handling unit 70, forming a transaction apparatus, internally includes the protocol controller 20, and is equipped with a protocol controller application for controlling this protocol controller 20, and an upper (host) application to be run by a host processing section (CPU) 72 to control this protocol controller application.

In a state where two IC cards (portable type mediums) 330-1, 330-2 are connected to the protocol controller 20, if the host processing section 72 makes a request for digital money transfer from one IC card 330-1 to the other IC card 330-2 to the protocol controller 20 (see an arrow indicated by the circled numeral 1), the protocol controller 20 conducts the actual digital money transfer processing (see an arrow indicated by the circled numeral 2), with the processing result being given from the protocol controller 20 to the host processing section 72 (see an arrow indicated by the circled numeral 3).

That is, the host processing section 72 (upper application) can handle a plurality of digital money different in mode from each other in a manner of only issuing a request for a transaction on digital money without paying no attention to the digital money protocol depending on the mode.

In an example as shown in FIG. 10, two digital money handling units 70, each identical to that described above, are provided to assume a system in which these units 70, 70 are connected to each other to be mutually communicable through a network 71, where digital money transfer between IC cards 330-1, 330-2 takes place with the IC cards 330-1, 330-2 being connected to protocol controllers 20, 20 of these two units 70, 70, respectively.

In this instance, an intercommunication path is first established between host processing sections 72, 72 in the two units 70, 70 (see arrows indicated by the circled numeral 1), and then the host processing section 72 of one unit 70 makes a request for digital money transfer from one IC card 330-1 to the other IC card 330-2 to the protocol controller 20 of the one unit 70 (see an arrow indicated by the circled numeral 2). In response to this request, the actual digital money transfer processing is effected through the intercommunication path on the network 71 between the two protocol controllers 20, 20 (see arrows indicated by the circled numeral 3). Following this, the protocol controller 20 of the one unit 70 informs the host processing unit 72 of that processing result (see an arrow indicated by the circled numeral 4), and the intercommunication path is lastly cut off (see arrows indicated by the circled numeral 5).

That is, also in this example, the host processing sections 72, 72 of the two units 70, 70 can handle a plurality of digital money, different in mode from each other, through the network 71 in a manner of only issuing a request for a transaction on digital money without paying no attention to the digital money protocol depending on the mode.

[1-6] Description of Example of Concrete Application of Protocol Controller

Figure 11:
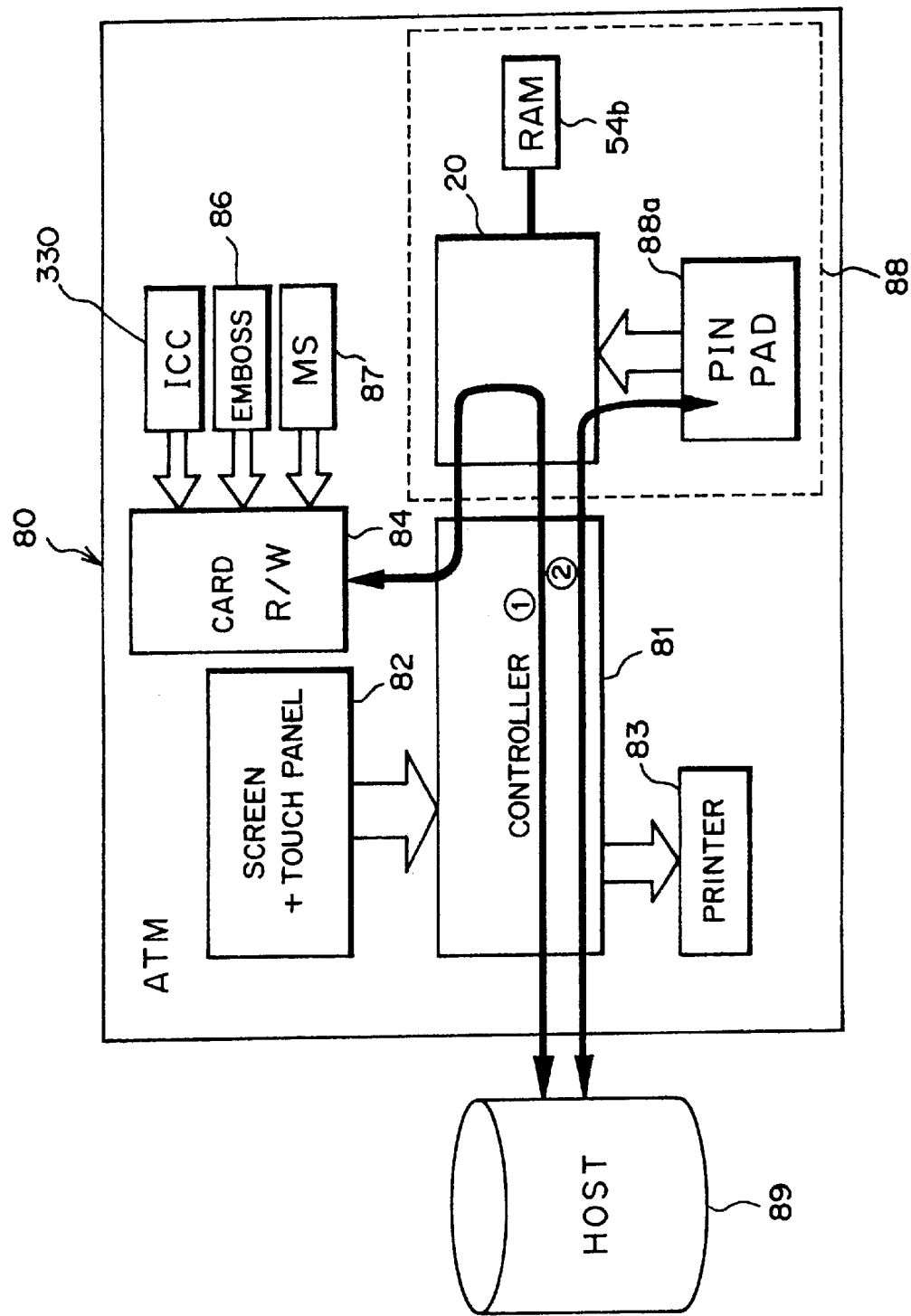
FIG. 11 is a block diagram showing an example of configuration of an ATM to which applied is the protocol controller according to this embodiment.
Figure 12:
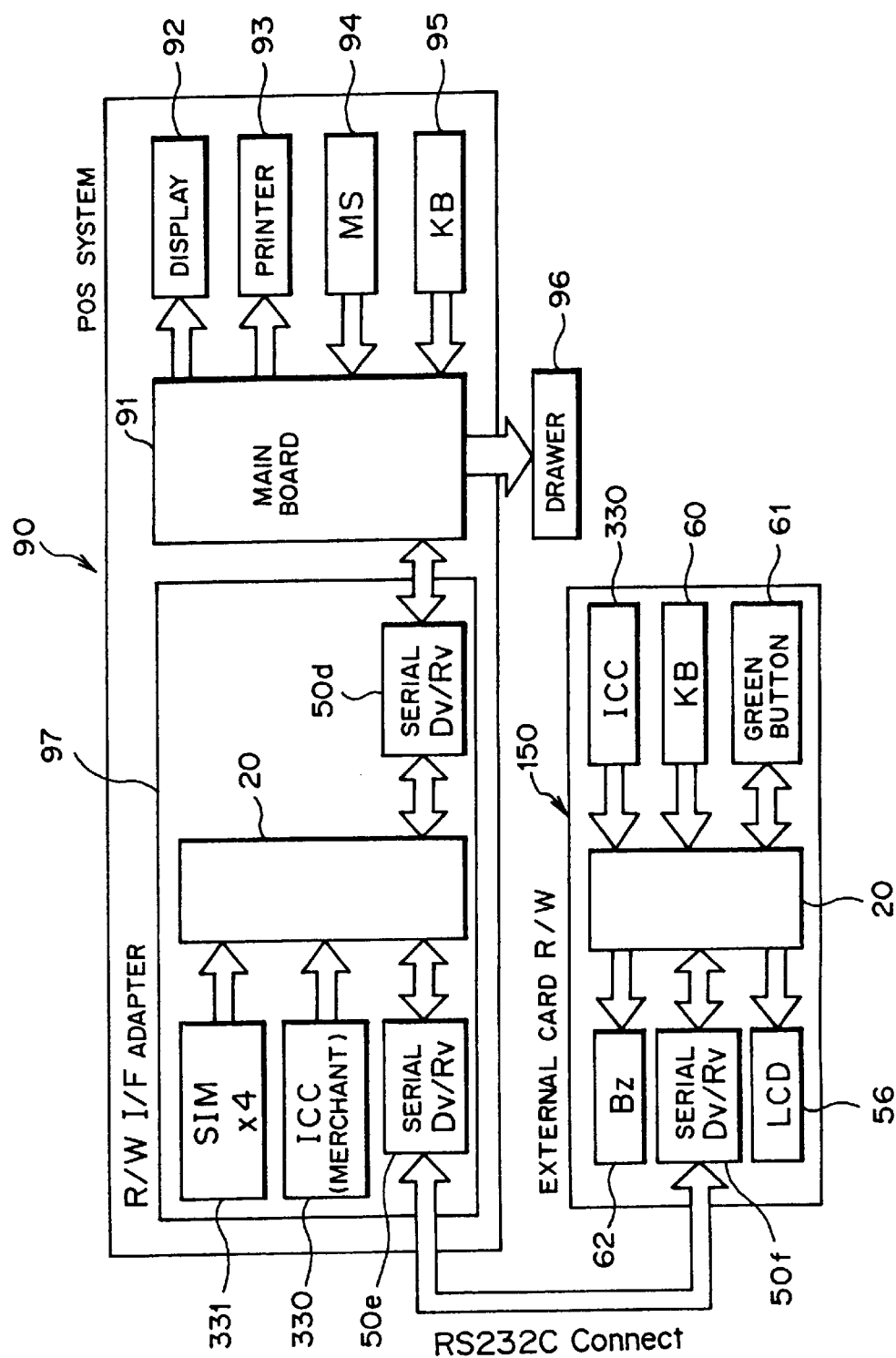
FIG. 12 is a block diagram showing examples of a POS system, to which applied is the protocol controller according to this embodiment, and an external card reader/writer.
Figure 13:
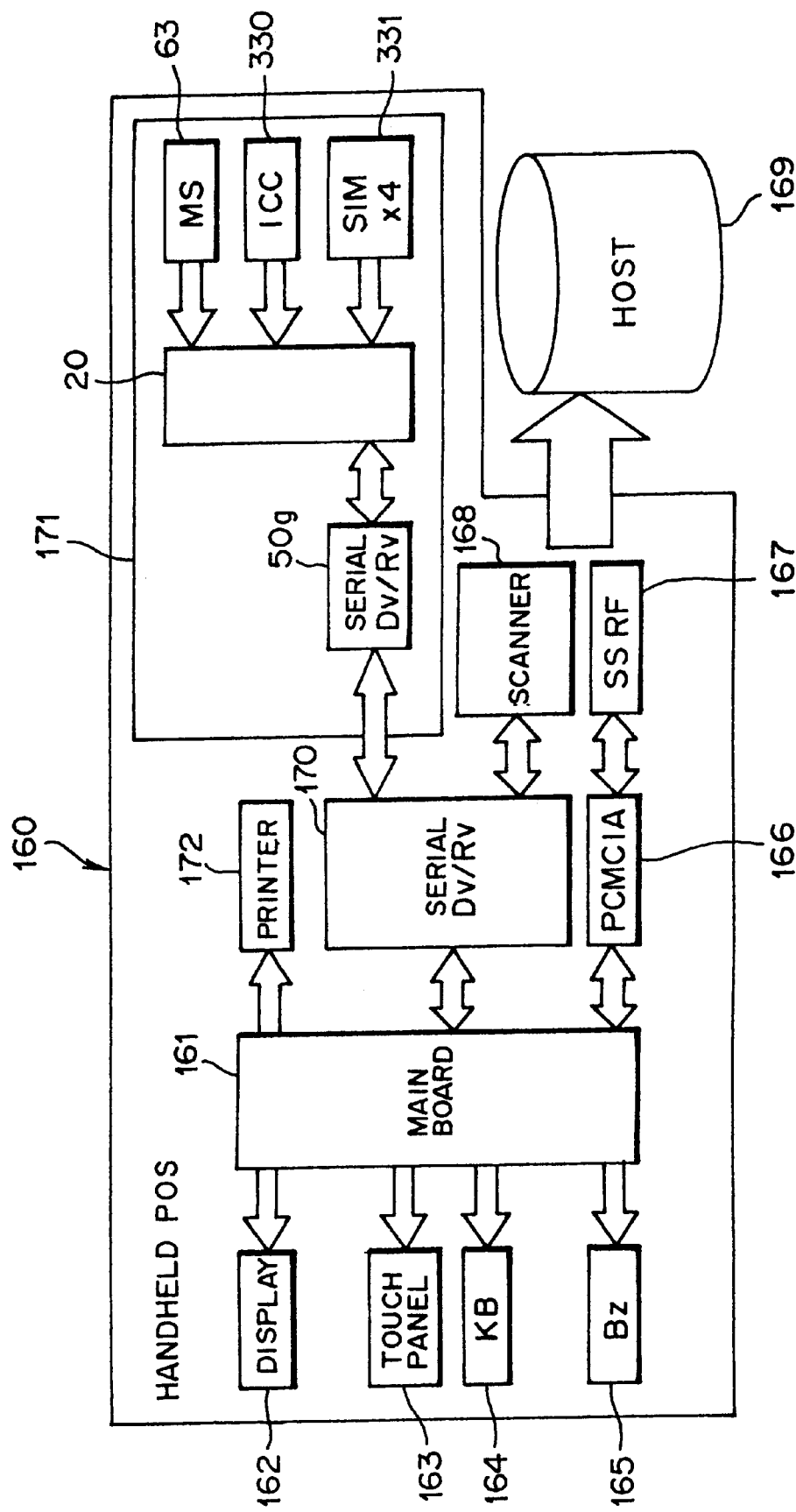
FIG. 13 is a block diagram showing an example of configuration of a hand held POS terminal to which applied is the protocol controller according to this embodiment.

Referring to FIGS. 11 to 13, a description will be given hereinbelow of an example of concrete application of the protocol controller 20 according to this embodiment (example of incorporation into various types of transaction apparatus).

FIG. 11 is a block diagram showing an example of configuration of an ATM (Automatic Teller Machine) 80 into which incorporated is the protocol controller 20 according to this embodiment. As shown in FIG. 11, the ATM 80 is made up of a control circuit (controller) 81, a screen/touch panel (Screen+Touch Panel) 82, a printer 83, a card reader/writer (Card R/W) 84 and a protocol controller block 88, and is connected to a host 89.

Furthermore, the protocol controller block 88 contains the protocol controller 20 according to this embodiment, while this protocol controller 20 is connected to an exterior type RAM 54b, and further connected to a PIN pad 88a, which is for inputting PINs (Personal Identification Numbers), in the form of a device.

In this instance, the control circuit 81 is for controlling the printer 83, the card reader/writer 84 and the protocol controller 20 in accordance with a signal from the host 89 or the screen/touch panel 82, or the like. Further, the card reader/writer 84 gains the write/readout access to an IC card 3310, and further has a function to read out an emboss section 86 made on the IC card 330 and magnetic information in a magnetic stripe portion (MS) 87 on the IC card 330.

Such an ATM 80 has various and diverse features, and is for handling extremely complicated IC cards 330 or the like, but all the features are impossible to achieve by the protocol controller 20. For this reason, the ATM 80 make use of the functions of the protocol controller 20 in conducting the processing related to a protocol for each of digital money (see arrows indicated by the circled numeral 1) or the processing concerning the cryptography of PIN (see arrows indicated by the circled numeral 2), whereas the control circuit 81 is made to conduct all the I/O control (for example, handling of the IC card 330, input of an mount of money, screen display, printing-out, and others) other than these processing.

For instance, although the actual I/O control to the card reader/writer 84 is done by the control circuit 81 as mentioned above, the control circuit 81 asks the protocol controller 20 to conduct, of the I/O control, the processing of a portion pertaining to the digital money protocol as shown by the arrows with the circled numeral 1, whereupon this protocol controller 20 conducts it through the use of a protocol control program for the mode of the digital money to be processed.

Furthermore, there is a case in which there is a need to encrypt the PIN, depending upon the digital money protocol. If handling such a digital money, the control circuit 81 makes the protocol controller 20 run the cryptography of the PIN inputted from the PIN pad 88a or the decryptment of the PIN encrypted as shown by the arrows with the circled numeral 2.

Thus, when the control circuit 81 conducts the processing through the use of the protocol controller 20, an operation request function by the foregoing control telegraphic statement 130 and a path control function by the device router 540 are effectively feasible.

FIG. 12 is a block diagram showing configurations of a POS system 90 incorporating the protocol controller 20 according to this embodiment, and an external card reader/writer 150. As shown in FIG. 12, the POS system 90 is made up of a main board 91, a display 92, a printer 93, an MS reader 94, a keyboard (KB) 95, a drawer 96 and a reader/writer interface adapter (R/W I/F Adapter) 97, and is connected to the external card reader/writer 150.

The reader/writer interface adapter 97 of the POS system 90 involves the protocol controller 20 according to this embodiment, while this protocol controller 20 is connected through serial driver/receiver 50d and 50e to the main board 91 and to the external card reader/writer 150, and further connected through a demultiplexer 340 (omitted from the illustration in FIG. 12) to four SIMs (Subscriber Identity Modules) 331 and to an IC card 330 functioning as a merchant card. In this case, the main board 91 receives a signal from the MS reader 94 or the keyboard (KB) 95 to control the operations of the display 92, the printer 93 and the drawer 96.

The external card reader/writer 150 involves the protocol controller 20 according to this embodiment, while this protocol controller 20 is connected through a serial driver/receiver 50f to the POS system 90, and further connected to an LCD 56, a keyboard 60, a green button 61, a buzzer (Bz) 62 and an IC card 330 each of which forms a device.

The POS system 90 is employed, for example, as a register in stores, and is connected to the aforesaid external card reader/writer 150, so that, when a customer performs a payment by digital money, the IC card 330 is mounted in the external card reader/writer 150 and the keyboard 60 or the green button 61 are manipulated by reference to the indication on the LCD 56, thereby accomplishing the payment of a predetermined amount of money. At this time, the two protocol controllers 20, 20 are cascade-connected under the main board 91 so that the digital money transfer processing between the IC card (merchant card) 330 on the POS system 90 side and the customer's IC card 330 in the external card reader/writer 150 takes place through these protocol controllers 20, 20.

FIG. 13 is a block diagram showing an example of configuration of a hand-held POS terminal (handy POS) 160 incorporating the protocol controller 20 according to this embodiment. As shown in FIG. 13, the hand-held POS terminal 160 is composed of a main board 161, a display 162, a touch panel 163, a keyboard (KB) 164, a buzzer (Bz) 165, a printer 172, a PC card interface (PCMCIA) 166, a radiocommunication section (SSRF) 167, a scanner 168, a serial driver/receiver 170, and a protocol controller block 171.

Furthermore, the protocol controller block 171 is provided with the protocol controller 20 according to this embodiment, where the main board 161 is connected through the serial driver/receiver 170 and a serial driver/receiver 50g to this protocol controller 20, and an MS reader 63, an IC card 330 and four SIMs 331 are further connected thereto.

In this instance, the main board 161 is connected through the serial driver/receiver 170 to the scanner 168, while it is additionally connected through the PC card interface (PCMCIA) 166 and the radiocommunication section (SSRF) 167 to a host 169. Moreover, the main board 161 receives signals from the touch panel 163 and the keyboard 164 to control the operations of the buzzer (Bz) 165 and the printer 172.

The hand-held POS terminal 160 is used for when a customer, making a payment, renders a settlement while, if in a restaurant or the like, remaining seated without leaving for a register (POS terminal). When rendering a payment by digital money, the touch panel 163 or the keyboard 164 is manipulated in a state where a customer's IC card 330 is set in the hand-held POS terminal 160, thereby accomplishing the necessary settlement. The information about the settlement (an amount of money paid, and others) is communicated from the host 169 to the hand-held POS terminal 160 by means of radio transmission, while the information about the digital money drawn out from the IC card 330 is radio-transmitted from the hand-held POS terminal 160 to the host 169. In this way, the protocol controller 20 in the hand-held POS terminal 160 is employed for when digital money is drawn out from the IC card 330 for settlement.

[1-7] Description of Cipher Key

In the protocol controller 20 according to this embodiment, since the ROM 22 is constructed as a mask ROM as mentioned before, it is also appropriate that a plurality of cipher keys or a set of cipher keys are stored in this ROM 22 in advance so that one key is selected from these cipher keys or set of cipher keys to be used together with the control program 5A or 5B.

In this case, the protocol controller 20 is internally designed such that one of the plurality of cipher keys or one of the cipher key set is specified by a telegraphic statement received from the external through the serial transmission/receive control circuit 26. Further, it is also acceptable that one of the plurality of cipher keys or one of the cipher key set is specified through the use of an external storage section (for example, the exterior type ROM 54a) connected through an interface circuit.

In such a manner that a plurality of cipher keys or a set of cipher keys are previously stored in the ROM 22 in the protocol controller 20 to be selectively switched from the exterior of the protocol controller 20, it is possible to deal with a plurality of cipher keys or a set of cipher keys while ensuring the security of the cipher keys.

[1-8] Description of Effects Attainable by Protocol Controller according to this Embodiment As described above, with the protocol controller 20 forming an embodiment of this invention, one protocol controller 20 can handle a plurality of digital money different in mode from each other, and it can be used in common among various types of transaction apparatus (for example, the ATM 80, the POS system 90, the external card reader/writer 150, and the hand-held POS terminal 160, mentioned before). At this time, if various types of peripheral control circuits are contained (integrated) in the protocol controller 20, a portion common to the various types of transaction apparatus is enlargeable.

In addition, in the protocol controller 20, since the ROM 22 for storing the control program 5A or 5B is constructed as a mask ROM, it is possible to inhibit the access to the control program 5A or 5B from the exterior of the protocol controller 20 coupled with ensuring the security. Additionally, the possible connection of the exterior type ROM 54a, which is to serve as a program storing external storage section, to the protocol controller 20 enhances the extendibility of the protocol controller 20.

Furthermore, the use of the control telegraphic statement 130 enables the designation of the classification (protocol control program) of digital money, to be used, from the exterior of the protocol controller 20, and further enable the direct control of the various types of peripheral control circuits, incorporated into the protocol controller 20, from the external, which allows the execution of processing (for example, using an IC card reader/writer irrespective of the processing on the digital money) other than the processing on various kinds of digital money.

Still further, a protocol controller 20 can singly be incorporated into a transaction apparatus and others, and, as shown in FIG. 8, a protocol controller 20 can be connected to the host system 51 or a plurality of protocol controllers 20 can be cascade-connected to the host system 51, which permits the construction of an extremely flexible system using the protocol controller 20.

As described above, the protocol controller 20 according to this embodiment exhibits extremely high versatility and, hence, can be used in common among various types of digital money handling transaction apparatus. Thus, if an approval is gained in terms of the protocol controller 20, an approval is needed only for unique portions of apparatus other than the protocol controller 20, and the need for the approval at every digital money taking a different mode is eliminable. Accordingly, it is possible to sharply reduce the man-hour for the design and development of each of various types of transaction apparatus, and further to considerably reduce the man-hour for the approval (man-hour for the verification for an approval) in an organization or the like, and even to realize improvement of reliability concurrently with a high security performance.

[2] Description of Device Connection State Recognizing Method for use in Protocol Controller according to this Embodiment Referring to FIGS. 14 to 19, a description will be made hereinbelow of a device connection state recognizing method to be applied to the protocol controller 20 according to this embodiment.

Although the CPU 21 of the protocol controller 20 according to this embodiment is, as mentioned before with reference to FIG. 3, equipped with an identification means to identify whether or not the exterior type ROM 54a is in connection with this protocol controller 20, it is also appropriate that a device connection state recognizing function is provided in place of this means. The employment of this device connection state recognizing function enables the recognition of connection/non-connection (connection state) of various types of devices other than the exterior type ROM 54a.

Figure 14:
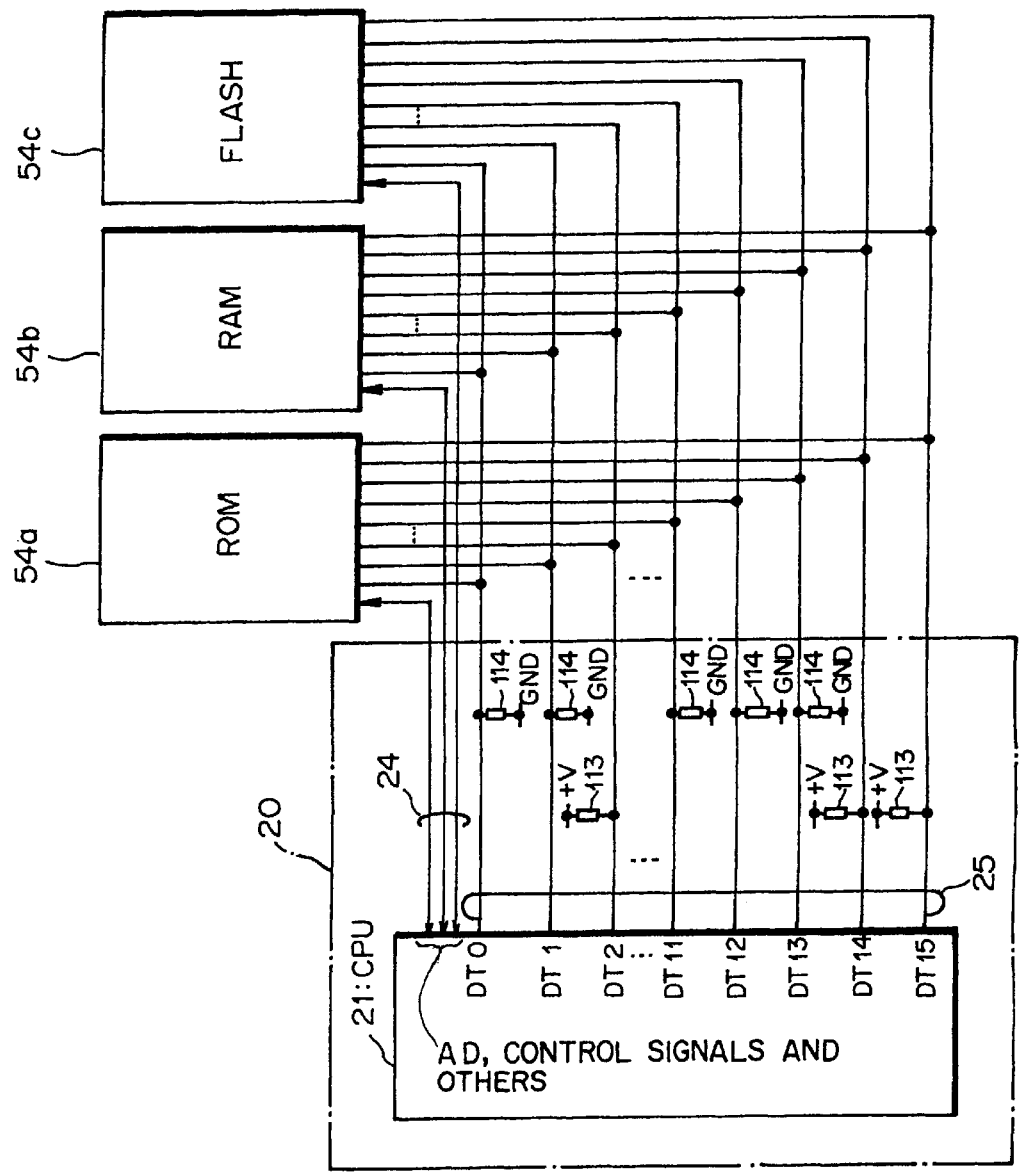
FIGS. 14 and 15 are illustrations of circuits, each for describing a device connection state recognizing method in the protocol controller according to this embodiment.
Figure 15:
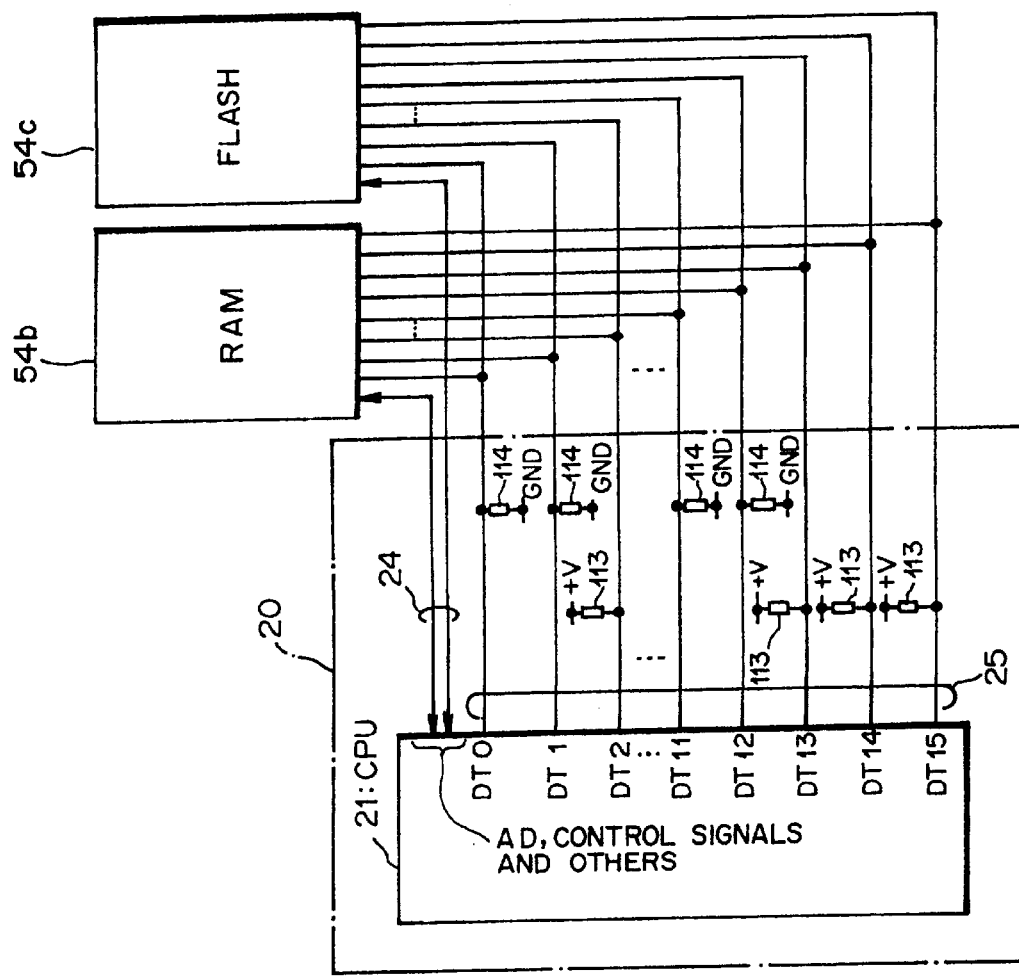

In FIGS. 14 and 15, a CPU 21, an address bus 24 and a data bus 25 in the protocol controller 20 are illustrated in a state of being extracted, whereas circuits and others producing other components are omitted from the illustration. FIG. 14 shows a circuit arrangement of the protocol controller 20 to which the exterior ROM 54a, the external type RAM 54b and the FROM (FLASH) 54c are connected as devices, while FIG. 15 shows a circuit arrangement of the protocol controller 20 to which the external type RAM 54b and the FROM (FLASH) 54c are connected as devices. Incidentally, in this embodiment, the data bus 25 employs a 16-bit type as with that mentioned before. That is, the data bus 25 comprises 16 data signal lines DT0 to DT15.

At the time of the design of the protocol controller 20, devices to be connected externally to the protocol controller 20 become apparent from the type of a transaction apparatus which is to incorporate the protocol controller 20. Whereupon, in this embodiment, at the manufacture of the protocol controller 20, each of the data signal lines DT0 to DT15 of the data bus 25 is previously connected through a pull-up resistor 113 to a high electric potential (+V) or connected through a pull-down resistor 114 to a low electric potential (ground: GND) to satisfy the needs of the types of devices to be connected to the protocol controller 20.

Furthermore, the CPU 21 of the protocol controller 20 specifies a predetermined logical address, in this embodiment the leading address C00000 of the exterior type ROM 54a (see FIG. 3), through the address bus 24 at the time of starting of the system to read out data through the data signal lines DT0 to DT15.

In this embodiment, in the case that the exterior type ROM 54a is connected to the protocol controller 20, the information about the devices to be connected to this protocol controller 20 is set in advance in the leading address C00000 of the exterior type ROM 54a in the form of a 16-bit structure information register (HWSTR: Hardware Structure Register) shown in FIG. 17.

Thus, if the exterior type ROM 54a is in connection with the protocol controller 20, by specifying the address C00000, the CPU 21 can read out the information in the structure information register (HWSTR) through the data bus 25.

On the contrary, if the exterior type ROM 54a is in no connection with the protocol controller 20, by specifying the address C00000, the CPU 21 reads out the high electric potential state/low electric potential state [1 (High)/0 (Low)], generated by the pull-up resistor 113/pull-down resistor 114 in the data signal lines DT0 to DT15, as the structure information data.

In this case, the 16-bit structure information data set by the pull-up resistor 113 and the pull-down resistor 114 is set to coincide fully with the data in the 16-bit structure information register (HWSTR) to be set at the leading address C00000 of the exterior type ROM 54a.

Figure 17:
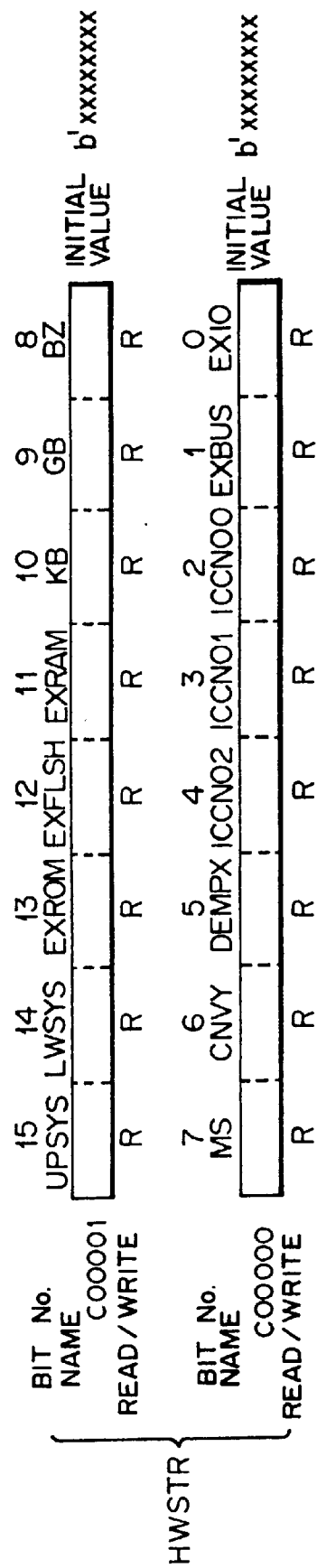
FIG. 17 illustrates an arrangement of a configuration information register (HWSTR) in the protocol controller according to this embodiment.

Referring to FIGS. 17 to 19, a description will be given hereinbelow of the data in the structure information register (HWSTR), that is, a method of setting the structure information data by the pull-up resistor 113 and the pull-down resistor 114.

Incidentally, the bit numbers 0 to 15 of the structure information register (HWSTR) correspond to the data signal lines DT0 to DT15 of the data bus 25, respectively. Concretely, if the bit number i (i=0 to 15) of the structure information register (HWSTR) assumes 0, the data, signal line DTi is connected through the pull-down resistor 114 to the low electric potential (GND). On the other hand, if the bit number i of the structure information register (HWSTR) assumes 1, the data signal line DTi is connected through the pull-up resistor 113 to the high electric potential (+V).

As FIGS. 17 and 18 show, the connection (0)/non-connection (1) of an extended I/O is set when the bit number takes 0, that is, when the data signal line DT0 is taken, while the connection (0):/non-connection (1) of an extended bus is set when the bit number assumes 1, that is, when the data signal line DT1 is taken. Further, the connection (0)/non-connection (1) of a card switch (demultiplexer 340) is set with the bit number 5, that is, with the data signal line DT5.

Furthermore, as shown in FIGS. 17 to 19, the number of (0 to 6) IC cards 330 to be connected to the protocol controller 20 is set with the bit numbers 2 to 4, that is, with the data signal lines DT2 to DT4.

Still further, the connection (0)/non-connection (1) of a conveying device (card conveyer 64) is made with the bit number 6, i.e., the data signal line DT6, while the connection (0)/non-connection (1) of the MS reader 63 is made with the bit number 7, i.e., the data signal line DT7. Moreover, the connection (0)/non-connection (1) of the buzzer 62 is made with the bit number 8, i.e., the data signal line DT8, while the connection (0)/non-connection (1) of the green button 61 is made with the bit number 9, i.e., the data signal line DT9, and even, the connection (0)/non-connection (1) of the keyboard 60 is made with the bit number 10, i.e., the data signal line DT10.

In like manner, the connection (0)/non-connection (1) of the exterior type RAM 54b is set with the bit number 11, that is, with the data signal line DT11, while the connection (0)/non-connection (1) of the exterior type FLASH 54c is set with the bit number 12, that is, with the data signal line DT12. Further, the connection (0)/non-connection (1) of the exterior type ROM 54a is set with the bit number 13, that is, with the data signal line DT13, while the connection (0)/non-connection (1) of a lower unit (for example, the subsystem 52) is set with the bit number 14, that is, with the data signal line DT14, and even, the connection (0)/non-connection (1) of an upper unit (for example, the host system 51) is set with the bit number 15, that is, with the data signal line DT15.

For instance, in the case of the example as shown in FIG. 14, at least the exterior type ROM 54a, the exterior type RAM 54b and the FROM (FLASH) 54c are connected as devices; hence, each of the data signal lines DT13, DT11, DT12 in the protocol controller 20 is connected through the pull-down resistor 114 to the low electric potential (GND).

Moreover, in the example as shown in FIG. 15, since at least the exterior type RAM 54b and the FROM (FLASH) 54c are connected as devices, each of the data signal lines DT11, DT12 in the protocol controller 20 is accordingly connected through the pull-down resistor 114 to the low electric potential (GND).

Besides, in the examples as shown in FIGS. 14 and 15, since each of the data signal lines DT0, DT1 is connected through the pull-down resistor 114 to the low electric potential (GND), although not shown in FIG. 14 or 15, an extended I/O and an extended bus are also in connection.

Furthermore, the CPU 21 functions as a recognizing section to recognize a connection state of a device connected to the protocol controller 20, to which it pertains, (that is, which device of the various types of devices shown in FIG. 18 is connected thereto) on the basis of the structure information data obtained by specifying the logical address C00000.

Besides, contrary to the above, it is also appropriate that the data signal line DTi of the data bus 25 is connected through the pull-up resistor 113 to the high electric potential if a device is in connection with the protocol controller 20, while the data signal line DTi of the data bus 25 is connected through the pull-down resistor 114 to the low electric potential if a device is in no connection with the protocol controller 20.

Figure 16:
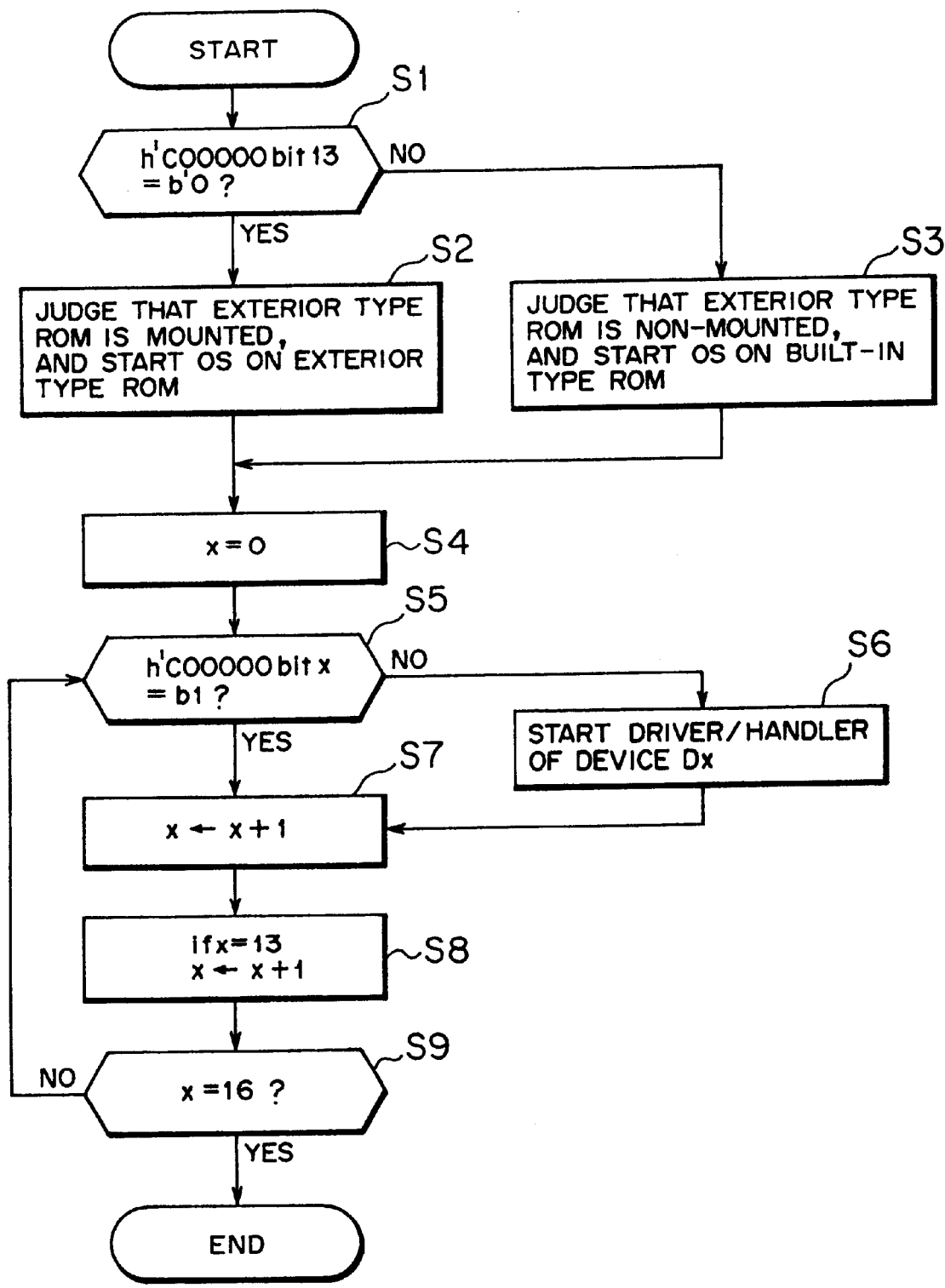
FIG. 16 is a flow chart available for describing a device connection state recognizing procedure in the protocol controller according to this embodiment.

Subsequently, according to the flow chart (steps S1 to S9) as shown in FIG. 16, a description will be taken hereinbelow of a procedure for the device connection state recognition in the CPU 21 of the protocol controller 20 according to this embodiment. Incidentally, in this embodiment, the CPU 21 recognizes the connection/non-connection of a device concurrently with starting the driver/handler (device control program) of the device connected.

At the time of starting of the system, the CPU 21 first specifies, through the address bus 24, the logical address C00000 allocated as the leading address of the exterior type ROM 54a, thereby gaining the 16-bit structure information data through the data bus 25 to judge whether or not the data obtained through the data signal line DT13 is "0" (step S1). That is, first of all, the CPU 21 recognizes whether or not the exterior type ROM 54a is in connection.

If that data assumes "0" (YES route from step S1), the CPU 21 makes a decision that the exterior type ROM 54a is mounted, and then starts the OS 521 (see FIGS. 4 and 6) on this exterior type ROM 54a (step S2). On the other hand, if the decision in the step S1 indicates that the data on the data signal line DT13 does not assume "0" that is, takes "1" (NO route from step S1), the CPU 21 makes a decision that the exterior type ROM 54a is not mounted yet, and hence starts the OS 521 on the built-in ROM 22 (step S3).

After the starting of the OS 521, the CPU 21 successively checks the data on the data signal lines 0 to 12, 14 and 15 other than the data signal line DT13. Concretely, "0" is set as the bit number x (step S4), before a judgment is made as to whether or not the data obtained through the data signal line DTx (x=0 to 12, 14 and 15) is "1" (step S5).

If that data does not assume "1", that is, takes "0" (NO route from step S5), the CPU 21 reads out the driver/handler of the device Dx corresponding to the bit number x from the device control program group 530 (see FIGS. 4 and 6) and starts it (step S6), then proceeding to a step S7 to be described hereinbelow.

On the other hand, if the decision in the step S5 shows that the data on the data signal line DTx is "1" (YES route from step S5), the CPU 21 judges that the device Dx is not mounted yet, and then adds 1 to the bit number x (step S7). At this time, if a new bit number x is the bit number 13 already subjected to judgment, it further adds 1 to the bit number x (step S8).

Furthermore, the CPU 21 judges whether or not a new bit number x is "16" (step S9). If x=16 (YES route), the CPU 21 terminates the processing. If x≈16 (NO route), the CPU 21 returns to the step S5 to repeatedly conduct the same processing.

In this way, in the device connection state recognizing method in the protocol controller 20 according to this embodiment, if only reading out, as the structure information data, the high electric potential state (1)/low electric potential state (0) generated through the pull-up resistor 113/pull-down resistor 114 on the data signal lines DT0 to DT15, the CPU 21 can recognizes the device connection state on the basis of the read structure information data with no addition of a dedicated signal line for detection or the like, and can start only the driver/handler (device control program) corresponding to that device.

While the ROM 22 or the exterior type ROM 54a to be mounted on the protocol controller 20 according to this embodiment stores the control program 5A or 5B having the drivers/handlers (device control programs) for all the devices, capable of being connected to the protocol controller 20, for accomplishing the versatility, even in the case of employing such versatile ROMs 22 and 54a, the CPU 21 can recognize the device as noted above, thereby starting only the driver/handler (device control program) for the connected device.

Accordingly, it is possible to eliminate the need for preparing a ROM storing a different control program at every transaction apparatus (computer system) incorporating the protocol controller 20 and to save the trouble to be needed in mounting a program in a ROM coupled with simplifying the component management, which contributes to considerable reduction of the cost required for the manufacture of various types of transaction apparatus (systems).

[3] Description of Method of Controlling Data Transfer between Protocol Controller according to this Embodiment and IC cards As described before with reference to FIG. 2, in this embodiment, the demultiplexer 340 is interposed between the protocol controller 20 and a maximum of six IC cards 330 mountable in this protocol controller 20.

That is, in this embodiment, in a way of placing the demultiplexer 340 between the protocol controller 20 and the IC cards 330, the protocol controller 20 is designed to control a maximum of six IC cards 330 through the use of its two ports A and B, in other words, its two IC card control circuits 36A and 36B.

This demultiplexer 340 makes connections between the six IC cards 330 and IC card control circuits 36A, 36B (ports A, B) of the protocol controller 20 as needed, and functions as a data transfer control unit (card switch) for controlling data transfer therebetween, thus selectively switching two IC cards 330 to be accessed by the protocol controller 20 and the ports A, B for connection therebetween.

Figure 22:
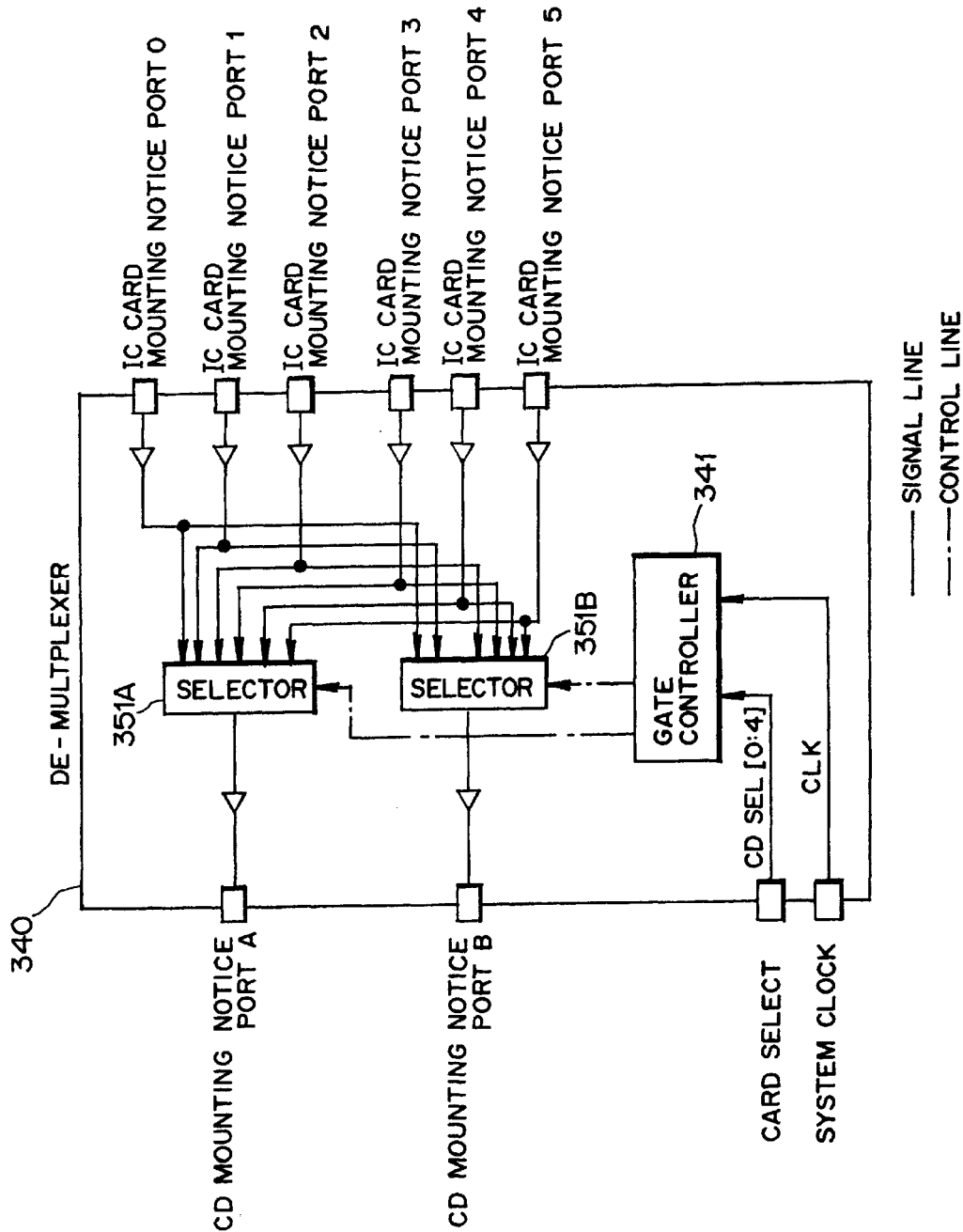

Referring to FIGS. 20 to 22, a description will be made hereinbelow of a detailed and concrete configuration of the demultiplexer 340.

FIG. 20 shows a configuration of a switching circuit in the demultiplexer 340 for signals (data and C4/C8 signals) to be bidirectionally communicated between the protocol controller 20 and the IC cards 330, FIG. 21 shows a configuration of a switching circuit in the demultiplexer 340 for signals (reset signals) to be communicated in one way from the protocol controller 20 to the IC cards 330, and FIG. 22 illustrates a configuration of a switching circuit in the demultiplexer 340 for signals (IC card mounting notice signals) to be communicated in one way from the IC cards 330 to the protocol controller 20. Further, as well as FIG. 2, in FIGS. 20 to 22, the six IC cards 330 (ICC0 to ICC5) are respectively mounted in the actual card ports (which will be referred hereinafter to as ports 0 to 5) to which port numbers 0 to 5 are given.

As shown in FIGS. 20 to 22, in this embodiment, the demultiplexer 340 is composed of a gate controller 341, two-input one-output selectors 342-0 to 342-5, 347-0 to 347-5, six-input one-output selectors 345A, 345B, 351A, 351B, latch circuits 343-0 to 343-5, 348-0 to 348-5, and three-state input/output ports 344-0 to 344-5, 346A, 346B, 349-0 to 349-5.

The gate controller 341 operates when receiving a system clock, and is for controlling the operations of the selectors 342-0 to 342-5, 347-0 to 347-5, the selectors 345A, 345B, 351A, 351B, the latch circuits 343-0 to 343-5, 348-0 to 348-5 and the three-state input/output ports 344-0 to 344-5, 346A, 346B, 349-0 to 349-5 in accordance with a select signal CDSEL[0:4] from the card selector 43 of the protocol controller 20. The select signal CDSEL[0:4] will be described in detail with reference to FIGS. 24 and 25 herein later.

As FIG. 20 shows, in the demultiplexer 340, the switching circuit for the signals (data and C4/C8 signals) to be communicated bidirectionally between the protocol controller 20 and the IC cards 330 is provided with the selectors 342-0 to 342-5, 345A, 345B, the latch circuits 343-0 to 343-5, the three-state input/output ports 344-0 to 344-5, and the three-state input/output ports 346A, 346B.

In this arrangement, each of the selectors 342-0 to 342-5 operates under control of the gate controller 341, and is for selectively switching (selecting) either of data (or C4/C8 signals) outputted from the two ports A, B of the protocol controller 20 and for outputting it to each of the six IC cards 330 (ICC0 to ICC5) sides.

The latch circuits 343-0 to 343-5 operate under control of the gate controller 341, and are for, when the ICC0 to ICC5 do not undergo access, respectively latching the signals, outputted from the selectors 342-0 to 343-5, immediately before the transition to the no-access condition.

The three-state input/output.ports 344-0 to 344-5 are to be controlled by the gate controller 341 to provide a high impedance state: when the ICC0 to ICC5 are not the object of access, or when the signals to be outputted to the ICC0 to ICC5 take "1", that is, a High state.

The selectors 345A, 345B are controlled by the gate controller 341 to selectively switch (select) any one of the data (or C4/C8 signals) outputted from the six IC cards 330 and further to output it to the ports A, B of the protocol controller 20.

With the above-described configuration, the data or the C4/C8 signals from the IC cards 330 to be connected to the port A of the protocol controller 20 are selected by the selector 345A and then inputted to the port A of the protocol controller 20, while the data or the C4/C8 signals from the IC cards 330 to be connected to the port B of the protocol controller 20 are selected by the selector 345B and then inputted to the port B of the protocol controller 20. Further, the data or the C4/C8 signals from the port A or B of the protocol controller 20 to be coupled to th e ICCi (i=0 to 5) are selected by the selector 342-i and then outputted through the latch circuit 343-i and the three-state input/output port 344-i to the ICCi.

As shown in FIG. 21, in the demultiplexer 340, the switching circuit for the signals (reset signals) to be communicated in one way from the protocol controller 20 to the IC cards 330 is provided with the selectors 347-0 to 347-5, the latch circuits 348-0 to 348-5 and the three-state input/output ports 349-0 to 349-5.

The selectors 347-0 to 347-5 work under control of the gate controller 341, and are for selectively switching (selecting) either of the reset signals outputted from the two ports A, B of the protocol controller 20 to output it to the six IC cards 330 (ICC0 to ICC5) sides.

The latch circuits 348-0 to 348-5 work under control of the gate controller 341, and are for, when the ICC0 to ICC5 do not undergo access, respectively latching the reset signals outputted from the selectors 342-0 to 342-5 immediately before the transition to the no-access condition.

The three-state input/output ports 349-0 to 349-5 are each controlled by the gate controller 341 to assume a high impedance state when the ICC0 to ICC5 are out of the object of access, or when the signals to be outputted to the ICC0 to ICC5 are "1", that is, are in a High state.

With the above-described configuration, the reset signal from the port A or B of the protocol controller 20 to be connected to the ICCi (i=0 to 5) is selected by the selector 347-i and then outputted through the latch circuit 348-i and the three-state input/output port 349-i to the ICCi.

As FIG. 22 shows, in the demultiplexer 340, the selectors 351A, 351B are placed in the switching circuit for the signals (IC card mounting notice signals) to be communicated in one way from the IC cards 330 to the protocol controller 20.

As mentioned before, the IC card mounting notice lines intervene between the ports A, B of the protocol controller 20 and the ports 0 to 5 for the IC cards 330, and the information (IC card mounting notice signal) indicative of whether or not each of the IC cards (ICC0 to ICC5) 330 is mounted in each of the ports 0 to 5 is given in one way to the ports A, B (IC card control circuits 36A, 36B) of the protocol controller 20.

Furthermore, the selectors 351A, 351B are controlled by the gate controller 341 to selectively switch (select) any one of the IC card mounting notice signals outputted from the six IC cards 330 for outputting it to the ports A, B of the protocol controller 20, respectively.

With the above-described configuration, the IC card mounting notice signals from the IC cards 330 to be connected to the port A of the protocol controller 20 are selected by the selector 345A and then inputted to the port A of the protocol controller 20, while the IC card mounting notice signals from the IC cards 330 to be connected to the port B of the protocol controller 20 are selected by the selector 345B and then inputted to the port B of the protocol controller 20.

Figure 23:
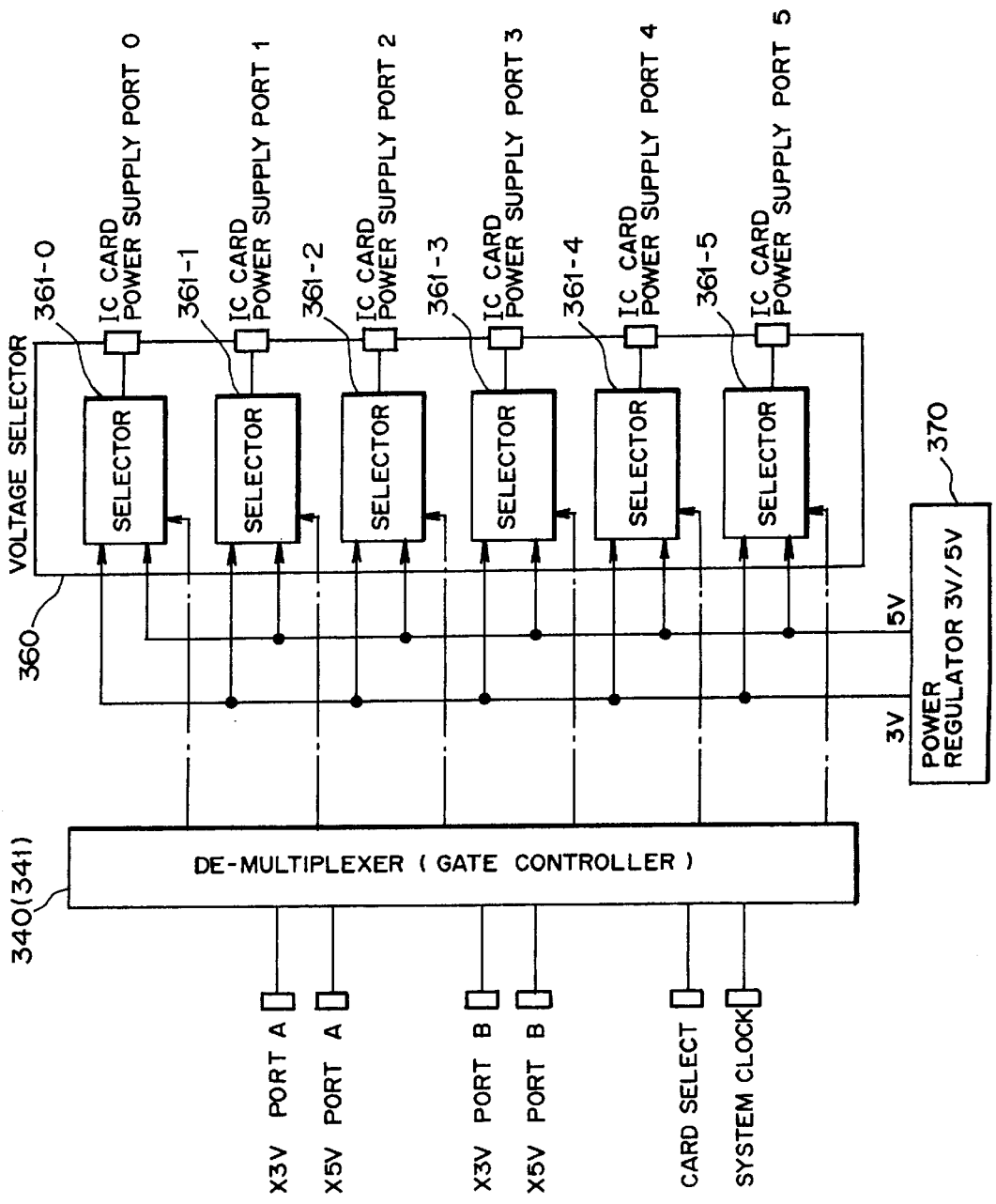
FIG. 23 is a block diagram showing an arrangement of a power supply system to an IC card, connected to the protocol controller according to this embodiment.

FIG. 23 is an illustration of a configuration of a power supply system to the IC cards 330, upto six in number, to be connected to the protocol controller 20 according to this embodiment. Also in FIG. 23, the six IC cards 330 (ICC0 to ICC5) are respectively mounted in the actual card ports (which will be referred hereinafter to as ports 0 to 5) to which port numbers 0 to 5 are given.

As FIG. 23 shows, in this embodiment, the power supply system is, as mentioned before with reference to FIG. 2, made up of the demultiplexer 340, the voltage selector 360 and the power regulator 370.

As noted before, the power regulator 370 produces and outputs two kinds of voltages: 3V and 5V, while the voltage selector 360 selects a voltage of 3V or 5V in accordance with an instruction from the demultiplexer 340, then supplying and applying it to each of the IC cards 330.

Furthermore, the voltage selector 360 is made up of two-input one-output selectors 361-0 to 361-5. These selectors 361-0 to 361-5 operate under control by the demultiplexer 340 (gate controller 341), and are for, when the ICC0 to ICC5 are mounted, selectively switching (selecting) either of the two voltages 3V, 5V from the power regulator 370 to always supply it as power to the six IC cards 330 (ICC0 to ICC5).

At this time, the demultiplexer 340 (gate controller 341) controls the selectors 361-0 to 361-5 of the voltage selector 360 in accordance with a signal from the card power control circuit 42 (see FIG. 2) of the protocol controller 20.

With the above-described construction, if the power voltage to be supplied to the ICCi (i=0 to 5) is 3V, the selector 361-i selects the power of 3V from the power regulator 370 to supply it to the ICCi. If the power voltage to be supplied to the ICCi (i=0 to 5) is 5V, the selector 361-i selects the power of 5V from the power regulator 370 to supply it to the ICCi.

Besides, as shown in FIG. 2, clock signals (control clocks) needed are supplied from the six card clock generators 38 in the protocol controller 20 according to this embodiment through the clock signal lines 350 to a maximum of six IC cards 330 connectable to the protocol controller 20, respectively. That is, in this embodiment, the clock signals for use in the IC cards 330 are supplied from the protocol controller 20 through the clock signal lines 350, whose number is the same as that (6) of the IC cards 330, to the IC cards 330, respectively, while the six IC cards 330 share the data transfer signal lines (data lines, C4 signal lines, C8 signal lines, reset signal lines, and others), provided in the two ports A, B of the protocol controller 20, through the demultiplexer 340.

Referring to FIGS. 24 and 25, a description will be made hereinbelow of a select signal CDSEL[0:4] to be supplied from the card selector 43 of the protocol controller 20 to the demultiplexer 340. FIG. 24 shows a configuration of an IC card port allocation register (CDSEL) to be used for when, in the protocol controller 20 according to this embodiment, a select signal CDSEL[0:4] is outputted to the demultiplexer 340, while FIG. 25 is an illustration for explaining the sense of each of bits in that IC card port allocation register.

As FIG. 24 shows, the IC card port allocation register (CDSEL) is, for example, 1-bite data set at the logical address 002080, with its low-order 5 bits (bit numbers 0 to 4) being put to use.

Such a 5-bit select signal CDSEL[0:4] is set as shown in FIG. 25, whereby selected are the IC card 330 (any one of the ICC0 to ICC5) to be connected to the port A of the protocol controller 20 and the IC card 330 (except the IC card 330 to be connected to the port A) to be connected to the port B of the protocol controller 20.

However, if all the 5 bits of the select signal CDSEL[0:4] are set to "0" as shown in FIG. 25, this select signal CDSEL[0:4] is used as a reset instruction signal of the demultiplexer 340 (including the latch circuits 343-0 to 343-5, 348-0 to 348-5). Further, if all the 5 bits of the select signal CDSEL[0:4] are set to "1", this select signal CDSEL[0:4] is used as a latch instruction signal for latching all the output signals to the IC cards 330 by the latch circuits 343-0 to 343-5, 348-0 to 348-5.

Figure 26:
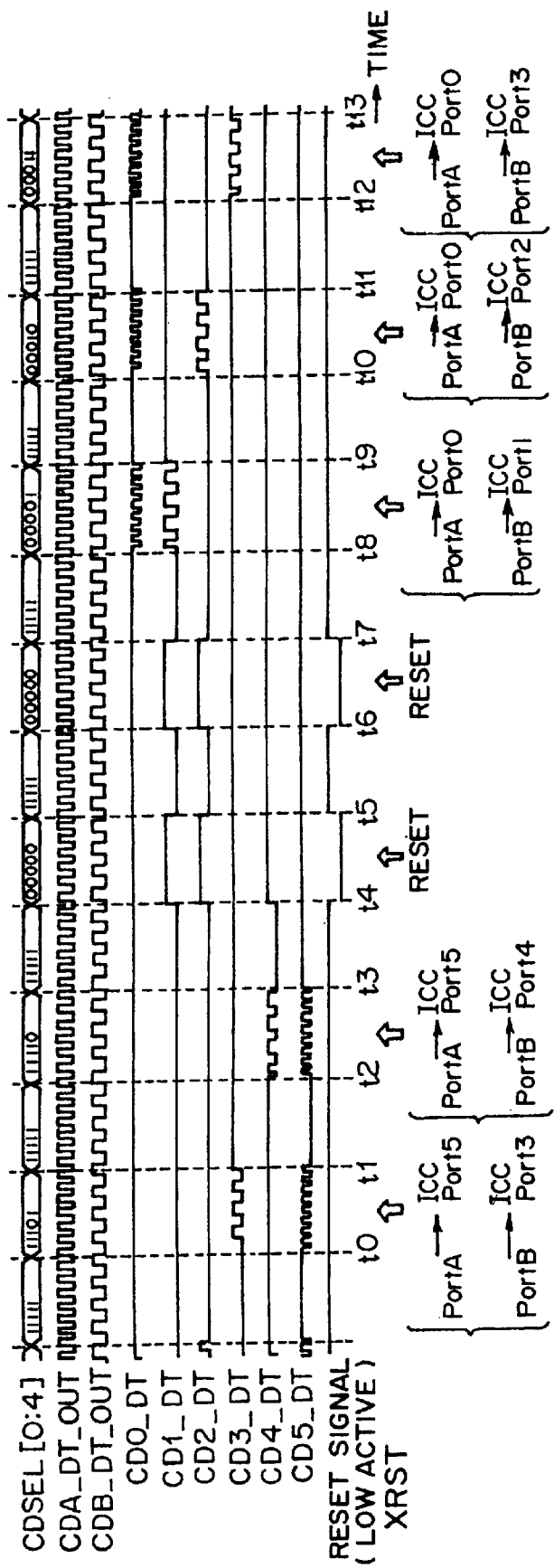
FIGS. 26 and 27 are time charts each for explaining an operation of the demultiplexer in this embodiment.
Figure 27:
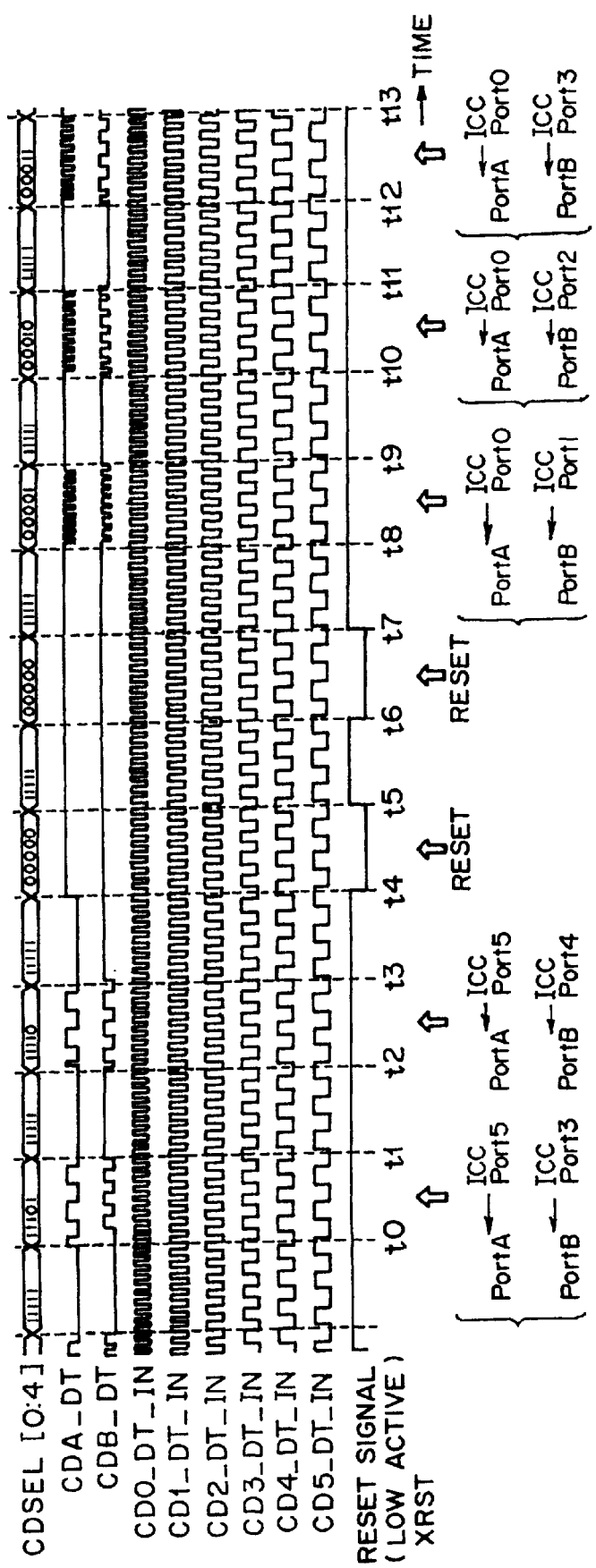
Figure 28:
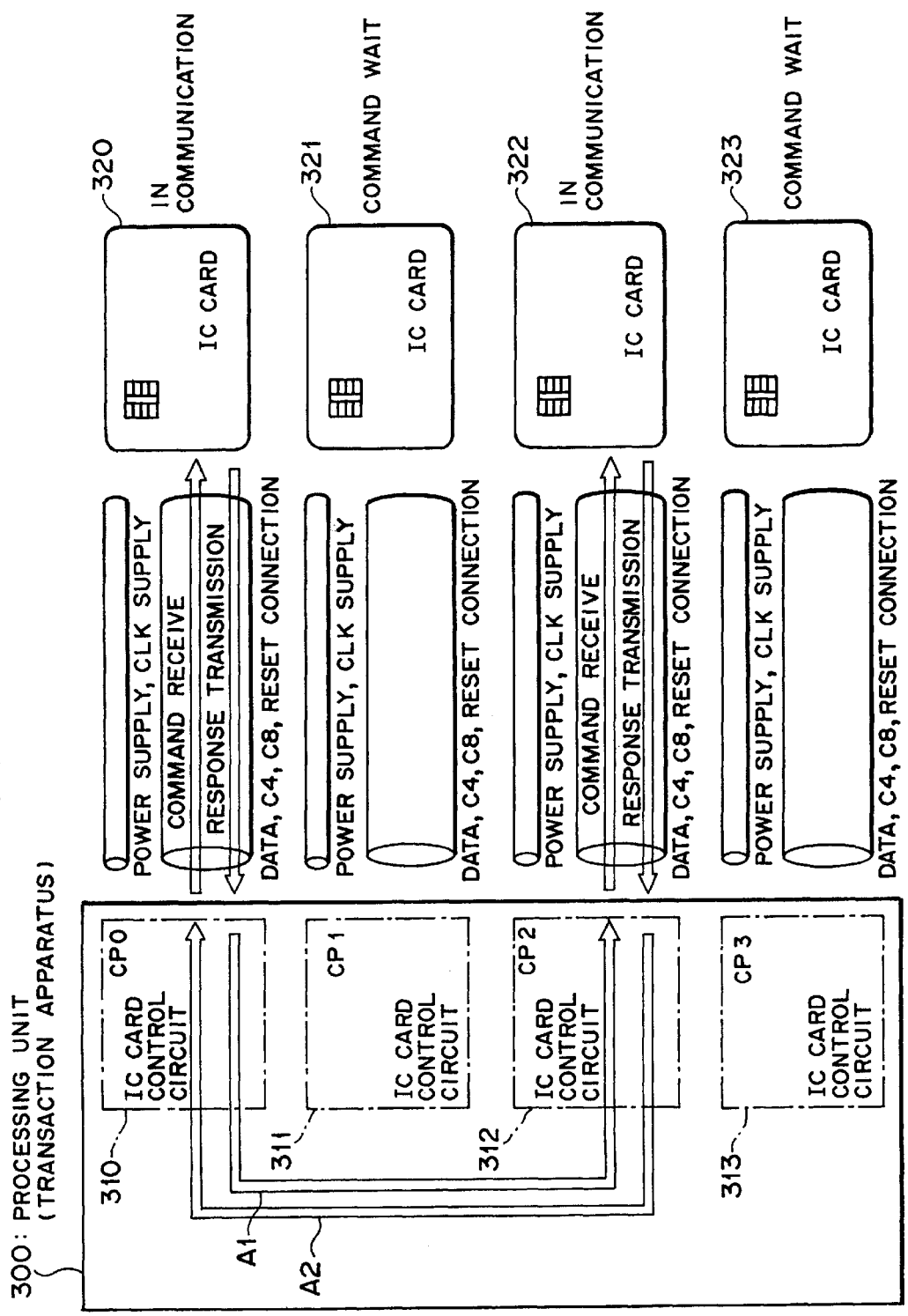
FIG. 28 is a block diagram showing the essence of a general transaction apparatus (processing unit) to which four IC cards (portable type mediums) are mountable.

Secondly, referring to FIGS. 26 and 27, a description will be given hereinbelow of a concrete switching operation of the demultiplexer 340 caused by the select signal CDSEL [0:4]. FIGS. 26 and 27 are time charts each for describing the switching operation of the demultiplexer 340 in this embodiment.

FIG. 26 shows signal waveforms to be outputted from the demultiplexer 340 to the IC cards 330 (ICC0 to ICC5) in the case that the protocol controller 20 controls the demultiplexer 340 through the use of the select signal CDSEL[0:4] to switch the IC cards 330 (ICC0 to ICC5) to be connected to the ports A, B in a state where rectangular waves with constant cycles are always outputted from the two ports A, B.

FIG. 27 illustrates signal waveforms to be inputted from the demultiplexer 340 to the ports A, B of the protocol controller 20 in the case that the protocol controller 20 controls the demultiplexer 340 through the use of the select signal CDSEL[0:4] to switch the IC cards 330 (ICC0 to ICC5) to be connected to the ports A, B in a state where the IC cards 330 (ICC0 to ICC5) always output rectangular waves with constant cycles.

In FIGS. 26 and 27, during the period from the time t0 to the time t1, the select signal CDSEL[0:4] is "11101" so that the ICC5 is connected to the port A while the ICC3 is connected to the port B. In like manner, during the period from the time t2 to the time t3, the select signal CDSEL[0:4] comes to "11110" so that the ICC5 is connected to the port A while the ICC4 is connected to the port B. During the period from the time t8 to the time t9, the select signal CDSEL[0:4] becomes "00001", thereby making a connection between the ICC0 and the port A and making a connection between the ICC1 and the port B. Further, during the period from the time t10 to the time t11, the select signal CDSEL[0:4] assumes "00010", thereby establishing a connection between the ICC0 and the port A and establishing a connection between the ICC2 and the port B. Still further, during the period from the time t12 to the time t13, the select signal CDSEL[0:4] forms "00011" to cause the ICC0 to be connected to the port A while causing the ICC3 to be connected to the port B. On the other hand, during the periods from the time t4 to the time t5 and from the time t6 to the time t7, the select signal CDSEL[0:4] forms "00000", thereby producing a reset signal XRST (low active) as mentioned before.

As shown in FIG. 26, a signal to be outputted from the demultiplexer 340 to each of the IC cards 330 (ICC0 to ICC5) is latched whenever the connection-accepting IC card 330 is switched by the select signal CDSEL[0:4] so that its state immediately before the switching is retained. Further, a signal from the corresponding port A or B is outputted to the selected IC card 330.

As shown in FIG. 27, signals inputted from the IC cards 330 (ICC0 to ICC5) to the demultiplexer 340 are switched in accordance with the select signal CDSEL[0:4] and outputted to the corresponding port A or B.

As mentioned before with reference to FIG. 2, in the protocol controller 20, the IC card control circuits 36A, 36B are provided for the ports A, B, respectively, and each of the IC card control circuits 36A, 36B operates in accordance with an instruction from the CPU 21 in the protocol controller 20, thereby accomplishing the access from the protocol controller 20 to the respective IC cards 330.

Furthermore, when receiving a command from each of the IC card control circuits 36A, 36B, each of the IC cards 330 under communication transmits a response to that command to each of the IC card control circuits 36A, 36B. The IC cards 330, being out of communication (out of the object of access), take a command waiting condition while receiving the supply of clock signals through the clock signal lines 350 and further receiving the power supply of a predetermined voltage (3V/5V) from the voltage selector 360 and the power regulator 370, so they can receive the command from each of the IC card control circuits 36A, 36B any time.

Still further, in a state where the plurality of IC cards 330 are connected to the protocol controller 20, the two IC card control circuits 36A, 36B, which have received instructions from the CPU 21 of the protocol controller 20, operate simultaneously, thereby gaining the access to the two portable type mediums 330 connected to the two parts A,B through the demultiplexer 340. In this way, by simultaneously having the access to the two portable type mediums 330, the protocol controller 20 conducts the data transfer processing to/from the two portable type mediums 330, 330.

As described above, with the data transfer control method in this embodiment, since the connection states between the two ports A, B and the six IC cards 330 are switched through the use of the demultiplexer 340 to allow the access to the IC cards 330 larger in number than the ports on the protocol controller 20 side, in the case of increasing the number of IC cards 330 to be controlled by the protocol controller 20, it is possible to eliminate the need for increasing the ports or the IC card control circuits on the protocol controller 20 side.

Accordingly, it is possible to increase the number of IC cards 330 to be controlled without raising the manufacturing cost of the protocol controller 20. Particularly, in the case of the integrated protocol controller 20 like this embodiment, even if the number of IC cards 330 to be controlled increases, there is no need to integrate a large number of lines or IC card control circuits at a high density, which greatly contributes to the reduction of the manufacturing cost or the circuit scale.

In addition, now that the signal states to the IC cards 330 being out of the object of access are latched, it is possible to certainly prevent the signal states to the IC cards 330 from fluttering and unstable immediately after these IC cards 330 are switched from non-accessed states to the accessed states.

Furthermore, through the use of the select signal CDSEL [0:4] from the protocol controller 20, it is possible to reset the switching operations by the demultiplexer 340 and the latching operations of the latch circuits 343-0 to 343-5, 348-0 to 348-5, or to latch all the output signals to a plurality of IC cards 330 with the latch circuits 343-0 to 343-5, 348-0 to 348-5, thus the operating state of the demultiplexer 340 and the latch state become easily controllable according to various situations.

Besides, in the case that the number of IC cards 330 to be connected to the protocol controller 20 is two and below, it is also appropriate to directly control the IC cards 330 through the two ports A, B of the protocol controller 20 without using the external demultiplexer 340.

Still further, although, in this embodiment, the demultiplexer 340 is constructed separately from the protocol controller 20, it is also appropriate that the demultiplexer 340, together with the protocol controller 20, is integrated on the same chip for unification.

Moreover, although, in the description of this embodiment, the number of ports of the protocol controller 20 is two and the maximum number of IC cards 330 to be connected to the protocol controller 20 is 6, this invention is not limited to these numbers.

[4] Others

It should be understood that the present invention is not limited to the above-described embodiment, and that it is intended to cover all changes and modifications of the embodiment of the invention herein which do not constitute departures from the spirit and scope of the invention.

For instance, although the above description of this embodiment has been made in the case that the portable type mediums form IC cards, this invention is not limited to this, but is likewise applicable to portable type mediums such as optical cards and radio cards, and the same effects as those of the above-described embodiment can be given also in this case.

Furthermore, although, in the above-described embodiment, the digital money are of two types, this invention is not limited to this. If handling three or more types of digital money, the control program 5A or 5B is made to have a protocol control program corresponding to the protocol for each of the digital money, which can provide the same effects as those of the above-described embodiment.

Still further, although the above description of this embodiment has been made in the case that the protocol controller 20 is used as a processing unit for controlling the data transfer between the protocol controller 20 and the IC cards 330, this invention is not limited to this, but is also applicable to when the data transfer is controlled between various types of processing units and portable type mediums, and can offer the same effects as those of the above-described embodiment.

What is claimed is:

1. A data transfer control method of controlling data transfer between a plurality of portable type mediums and a processing unit having an ability to gain access to said plurality of portable type mediums, said method comprising the steps of:

connecting to one or more portable type medium ports, provided in said processing unit, said plurality of portable type mediums whose number is larger than the number of said ports, through a demultiplexer; and making said demultiplexer selectively switch each of said ports via a select signal connecting said processing unit and said demultiplexer and, of said plurality of portable type mediums, each of mediums to be accessed by said processing unit to establish connection between said portable type mediums and said ports, wherein said processing unit is able to issue commands for all or selected portable type mediums to enter a wait state and latch all or selected ports to enable communication to selected portable type mediums.

2. A data transfer control method as defined in claim 1, further comprising the steps of:

supplying control clocks to be used in said plurality of portable type mediums from said processing unit through clock signal lines, whose number is identical to that of said portable type mediums, to said plurality of portable type mediums, respectively; and making said plurality of portable type mediums share data transfer signal lines, installed for each of said ports on the processing unit side, through said demultiplexer.

3. A data transfer control method as defined in claim 2, further comprising the step of latching a state of a signal to, of said plurality of portable type mediums, each of mediums which are not to be accessed by said processing unit.

4. A data transfer control method as defined in claim 3, wherein a select signal, which is for selecting and designating each of said portable type mediums to be connected to said ports as said medium to be accessed, is supplied from said processing unit to said demultiplexer to make said demultiplexer conduct the selectively switching operation, while said portable type medium, which is not selected an designated by said select signal, is treated as said medium which is not to be accessed, and a state of a signal to said portable type medium treated as said medium which is not to be accessed is latched immediately before transition to its no-access condition.

5. A data transfer control method as defined in claim 4, wherein said select signal set to have a specific signal state is used as a reset instruction signal for reset of said demultiplexer and the signal state latching operation.

6. A data transfer control method as defined in claim 4, wherein said select signal set to have a specific signal state is used as a latch instruction signal for latching all the states of signals to said plurality of portable type mediums.

7. A data transfer control method as defined in claim 1, further comprising the step of latching a state of a signal to, of said plurality of portable type mediums, each of mediums which are not to be accessed by said processing unit.

8. A data transfer control method as defined in claim 7, wherein a select signal, which is for selecting and designating each of said portable type mediums to be connected to said ports as said medium to be accessed, is supplied from said processing unit to said demultiplexer to make said demultiplexer conduct the selectively switching operation, while said portable type medium, which is not selected and designated by said select signal, is treated as said medium which is not to be accessed, and a state of a signal to said portable type medium treated as said medium which is not to be accessed is latched immediately before transition to its no-access condition.

9. A data transfer control method as defined in claim 8, wherein said select signal set to have a specific signal state is used as a reset instruction signal for reset of said demultiplexer and the signal state latching operation.

10. A data transfer control method as defined in claim 8, wherein said select signal set to have a specific signal state is used as a latch instruction signal for latching all the states of signals to said plurality of portable type mediums.

11. A data transfer control system, interposed between a plurality of portable type mediums and a processing unit having an ability to gain access to said plurality of portable type mediums, for controlling data transfer between said plurality of portable type mediums and said processing unit, said system, comprising:

a demultiplexer for making connection between one or more portable type medium ports in said processing unit and said plurality of portable type mediums whose number is larger than the number of said ports, with said demultiplexer selectively switching each of said ports and, of said plurality of portable type mediums, each of mediums to be accessed by said processing unit to establish connection between said ports and said portable type mediums, wherein said processing unit is able to issue commands for all or selected portable type mediums to enter a wait state and latch all or selected ports to enable communication to selected portable type mediums.

12. A data transfer control system as defined in claim 11, further comprising a latch circuit, provided for each of said portable type mediums, for latching a state of signal to each of portable type mediums which are to be accessed by said processing unit.

13. A data transfer control system as defined in claim 12, wherein said demultiplexer switches states of connections between said ports and said portable type mediums to be accessed in accordance with a select signal which is supplied from said processing unit and which is for selecting and designating said portable type mediums to be connected to said ports as said portable type mediums to be accessed, while said latch circuit treats said portable type medium, which is not selected and designated by said select signal, as the portable type medium which is not to be accessed, and further latches a state of a signal to said portable type medium, which is not to be accessed, immediately before transition to a no-access condition.

14. A data transfer control system as defined in claim 13, wherein said select signal set to have a specific signal state is used as a reset instruction signal for reset of said demultiplexer and said latch circuit.

15. A data transfer control system as defined in claim 13, wherein said select signal set to have a specific signal state is used as a latch instruction signal for making said latch circuits latch all the states of signals to said plurality of portable type mediums.

* * * * *